(12) United States Patent
Selvam et al.

(10) Patent No.: US 11,815,976 B2
(45) Date of Patent: Nov. 14, 2023

(54) BANDWIDTH BASED POWER MANAGEMENT FOR PERIPHERAL COMPONENT INTERCONNECT EXPRESS DEVICES

(71) Applicant: QUALCOMM Incorporated, San Diego, CA (US)

(72) Inventors: Thiyagarajan Selvam, San Diego, CA (US); Dilip Venkateswaran Murali, San Diego, CA (US); Murali Krishna, San Diego, CA (US); Sujeev Dias, San Marcos, CA (US); Tony Truong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 27 days.

(21) Appl. No.: 15/931,409

(22) Filed: May 13, 2020

(65) Prior Publication Data

US 2020/0371579 A1 Nov. 26, 2020

Related U.S. Application Data

(60) Provisional application No. 62/852,925, filed on May 24, 2019, provisional application No. 62/851,633, filed on May 22, 2019.

(51) Int. Cl.
*G06F 1/3234* (2019.01)
*G06F 13/42* (2006.01)

(52) U.S. Cl.
CPC ........ *G06F 1/3253* (2013.01); *G06F 13/4282* (2013.01); *G06F 2213/0026* (2013.01)

(58) Field of Classification Search
CPC ............... G06F 13/4027; G06F 13/385; G06F 13/4282; G06F 13/00; G06F 13/4265; G06F 3/1221; G06F 3/1236; G06F 2213/0026; G06F 1/3253; G06F 1/3209; G06F 1/3215; G06F 1/324; G06F 1/3278; G06F 13/4295; G06F 13/4063; H04L 41/0896; H04L 47/76; Y02D 10/00
USPC ........ 713/320; 710/105, 313, 104, 316, 106, 710/305, 306, 314; 370/468
See application file for complete search history.

(56) References Cited

U.S. PATENT DOCUMENTS

| | | | | |
|---|---|---|---|---|
| 6,003,062 A | * | 12/1999 | Greenberg | H04Q 11/0478 718/107 |
| 7,257,632 B2 | * | 8/2007 | Zhang | H04L 47/765 709/226 |
| 7,461,195 B1 | * | 12/2008 | Woodral | G06F 13/4291 710/316 |
| 7,469,311 B1 | | 12/2008 | Tsu et al. | |
| 7,934,032 B1 | * | 4/2011 | Sardella | G06F 13/4022 710/316 |

(Continued)

OTHER PUBLICATIONS

International Search Report and Written Opinion—PCT/US2020/032907—ISA/EPO—dated Aug. 4, 2020.

*Primary Examiner* — Faisal M Zaman
(74) *Attorney, Agent, or Firm* — Loza & Loza, LLP

(57) ABSTRACT

A system includes an interface circuit configured to provide an interface with a link, and a controller. The controller is configured to receive one or more bandwidth requests from one or more clients, and determine at least one of a link speed and a link width for the link based on the one or more bandwidth requests.

34 Claims, 10 Drawing Sheets

(56) References Cited

U.S. PATENT DOCUMENTS

| | | | | |
|---|---|---|---|---|
| 8,707,104 B1* | 4/2014 | Jean | | G06F 11/0793 |
| | | | | 714/6.24 |
| 9,842,075 B1* | 12/2017 | Davis | | G06F 13/4295 |
| 11,596,025 B2* | 2/2023 | Haustein | | H04B 7/0697 |
| 2006/0015761 A1* | 1/2006 | Kwa | | G06F 1/3296 |
| | | | | 713/320 |
| 2006/0187905 A1* | 8/2006 | Manabe | | H04W 28/0205 |
| | | | | 370/310 |
| 2007/0008898 A1* | 1/2007 | Sharma | | G06F 13/4278 |
| | | | | 370/252 |
| 2007/0113123 A1* | 5/2007 | Crouch | | H04L 49/65 |
| | | | | 714/724 |
| 2008/0317069 A1* | 12/2008 | Huang | | H04L 5/1438 |
| | | | | 370/503 |
| 2011/0161547 A1* | 6/2011 | Barbiero | | G06F 13/00 |
| | | | | 710/316 |
| 2011/0188621 A1* | 8/2011 | Asaduzzaman | | H04L 7/0337 |
| | | | | 375/374 |
| 2011/0222111 A1* | 9/2011 | Shima | | G06F 13/4282 |
| | | | | 358/1.15 |
| 2011/0317716 A1* | 12/2011 | Chalupsky | | H04L 47/822 |
| | | | | 370/465 |
| 2012/0047308 A1* | 2/2012 | Feng | | G06F 13/4059 |
| | | | | 710/311 |
| 2012/0089755 A1* | 4/2012 | Shiu | | G06F 13/4282 |
| | | | | 710/60 |
| 2013/0051483 A1* | 2/2013 | Wyatt | | H04L 25/03885 |
| | | | | 375/259 |
| 2013/0067127 A1* | 3/2013 | Hopgood | | G06F 13/00 |
| | | | | 710/104 |
| 2013/0142202 A1* | 6/2013 | Cors | | H04L 45/44 |
| | | | | 370/401 |
| 2014/0003451 A1* | 1/2014 | Wagh | | G06N 20/00 |
| | | | | 370/468 |
| 2014/0372777 A1* | 12/2014 | Reller | | G06F 13/161 |
| | | | | 713/320 |
| 2015/0067433 A1* | 3/2015 | Wagh | | G06F 13/1631 |
| | | | | 714/748 |
| 2015/0254003 A1* | 9/2015 | Lee | | H04L 67/1097 |
| | | | | 711/103 |
| 2016/0283429 A1* | 9/2016 | Wagh | | G06F 13/36 |
| 2017/0063449 A1* | 3/2017 | Dreps | | H04B 10/038 |
| 2017/0280385 A1* | 9/2017 | Klacar | | H04L 41/083 |
| 2018/0287964 A1* | 10/2018 | Gray | | H04L 49/109 |
| 2019/0065116 A1* | 2/2019 | Sekine | | G06F 3/0634 |
| 2019/0095554 A1* | 3/2019 | Ooi | | G06F 30/33 |
| 2019/0250930 A1* | 8/2019 | Erez | | G06F 1/3281 |
| 2021/0133140 A1* | 5/2021 | Jeansonne | | G06F 13/4282 |

\* cited by examiner

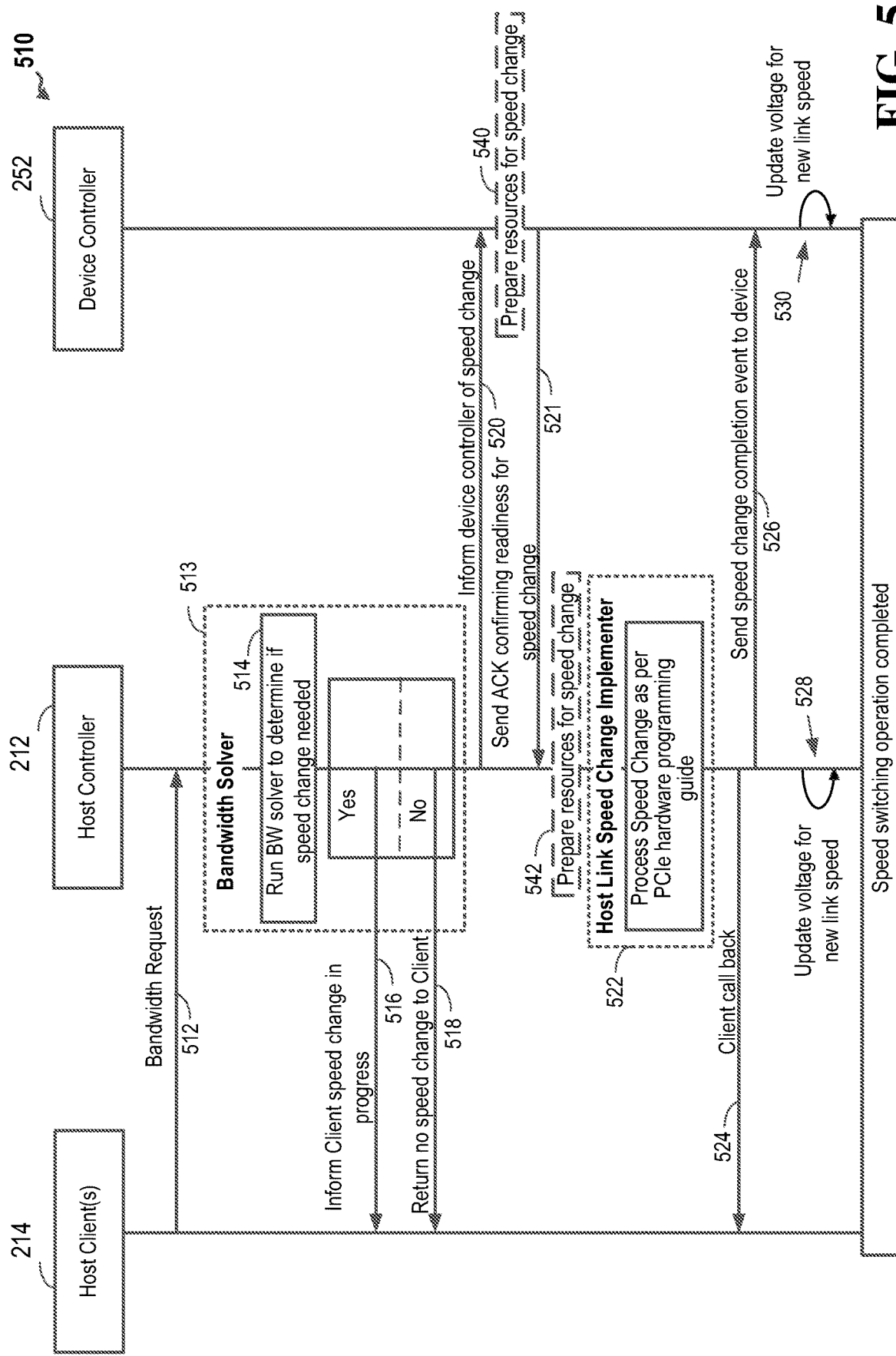

BANDWIDTH BASED POWER MANAGEMENT FOR PERIPHERAL COMPONENT INTERCONNECT EXPRESS DEVICES

PRIORITY CLAIM

This application claims priority to and the benefit of Provisional Patent Application No. 62/851,633, filed in the United States Patent and Trademark Office on May 22, 2019, and Provisional Patent Application No. 62/852,925, filed in the United States Patent and Trademark Office on May 24, 2019, wherein the entire contents of these applications are incorporated herein by reference as if fully set forth below in its entirety and for all applicable purposes.

INTRODUCTION

Field

Aspects of the present disclosure relate generally to peripheral component interconnect express (PCIe) devices, and more particularly, to managing power for PCIe devices.

Background

A system may include one or more processors (e.g., application processor) and peripheral devices such as a wireless modem, a graphics processor, a display, a sensor, etc. The one or more processors may communicate with the peripheral devices using high-speed communication links according to a standard (i.e., protocol). One popular standard is the peripheral component interconnect express (PCIe) standard, which supports a high-speed link capable of transmitting data at multiple gigabits per second.

SUMMARY

The following presents a simplified summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a simplified form as a prelude to the more detailed description that is presented later.

An aspect relates to a system. The system includes an interface circuit configured to provide an interface with a link, and a controller. The controller is configured to receive one or more bandwidth requests from one or more clients, and determine at least one of a link speed and a link width for the link based on the one or more bandwidth requests.

Another aspect relates to a method. The method includes receiving in a controller one or more bandwidth requests from a client concerning communications over a link between a link partner and the client. Additionally, the method includes determining in the controller at least one of a link speed and a link width for the link based on the one or more bandwidth requests, and implementing a speed change in the client with the controller based on at least one of the determined link speed and link width for the link. Further, the method includes transmitting a speed change request with the controller to the link partner over the link, the request based at least one of the determined link speed and link width for the link.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the described implementations are intended to include all such aspects and their equivalents.

BRIEF DESCRIPTION OF THE DRAWINGS

FIG. 5 is a call flow diagram showing another example of a bandwidth based power management method according to certain aspects of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the present disclosure provide bandwidth based PCIe power management using link speed and/or link width scaling. Aspects of the present disclosure are discussed below using the examples of PCIe GEN1 to GEN4. However, it is to be appreciated that the present disclosure is not limited to these examples, and that the present disclosure may be used to provide power management for future implementations of the PCIe standard (e.g., GEN5 and beyond). Furthermore, it is noted that while the present disclosure is discussed in relation to PCIe links, those skilled in the art will appreciate that the underlying principles of the disclosed systems and methods may be implemented in other types of PCI links or even in other physical serial interconnects between host and client devices.

Figure 1:
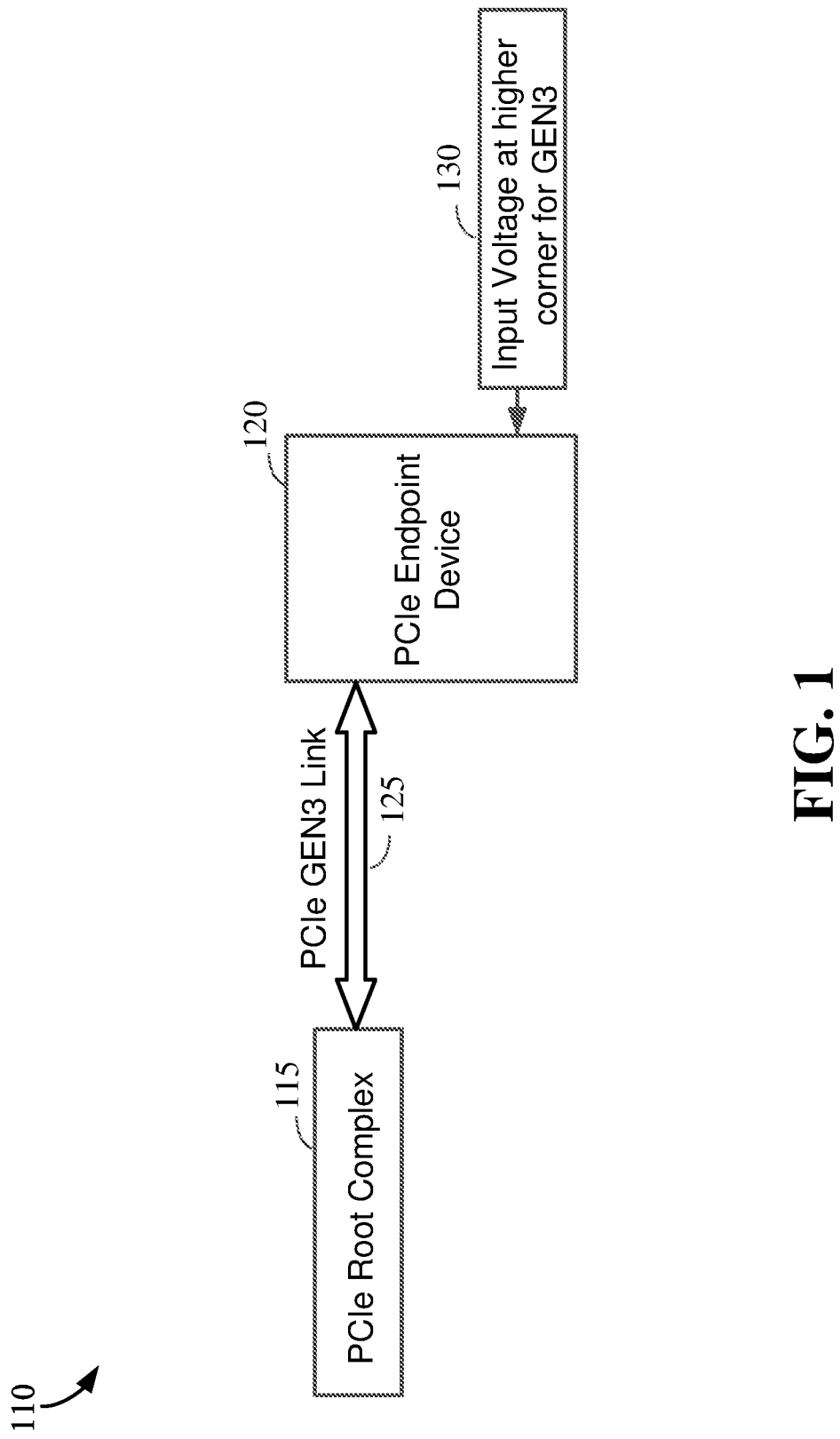
FIG. 1 shows an example of a root complex coupled to an endpoint device according to certain aspects of the present disclosure.

FIG. 1 shows a particular example of a PCIe GEN3 capable system 110 including a PCIe root complex 115 (e.g., on a host device) and a PCIe endpoint device 120, in which the root complex 115 and the endpoint device 120 are coupled by a PCIe link 125 running at a GEN3 speed (capable of up to 8.0 GT/s theoretical speed). In this example, the link 125 is operated at the GEN3 speed even at times when the link 125 is being underutilized by low bandwidth applications that could be adequately served by a GEN2 speed or a lower speed. Operating the link 125 at GEN3 speed may require keeping the supply voltages to the PCIe core and physical layer (PHY) at higher voltage levels (also referred to as voltage corners) compared with GEN2 or lower speeds. Thus, keeping the link 125 at GEN3 speed for the low bandwidth applications keeps the supply voltages higher than needed (e.g., Input voltage 130 at higher corner as shown by block 130), which leads to more leakage and faster battery drain.

A current approach for managing power specified in the PCIe specification is Active state Power Management (ASPM), which employs methods to reduce power based on link activity detected over the PCIe link between the root complex and an endpoint PCIe device. In this approach, the link operates in an L0 power state (i.e., link operation state) when data is being transferred over the PCIe link. When the link is idle (e.g., for a short time interval between data bursts), the link may be taken from the L0 state to lower power states (e.g., L0s→L1→L1.1/L1.2) to reduce power consumption. In this example, the L0s is a low power standby for state L0 and the L1 sub-states are the lowest possible active low power states for the PCIe link Even though this approach reduces power consumption at the link level, this approach does not change the voltage domain of the PCIe devices. Thus, when the link is operated at GEN3 speed or a higher PCIe speed, the voltage domain will remain at higher voltage levels (corners) for GEN3 and higher speed PCIe generations.

In the current approach, a PCIe link running at its maximum speed runs at its maximum speed even during low throughput traffic scenarios. This not only consumes more power for the PCIe controller and PHY but also requires other systems that interface with the PCIe to run at higher clock frequency such as, but not limited to, a memory subsystem and a system bus interface.

To address this, aspects of the present disclosure provide a coordinated power management approach between a root complex and an endpoint device controller that achieves dynamic PCIe link speed and/or link width scaling based on the bandwidth requirement of one or more clients. In this way, during lower bandwidth use cases, the GEN speed at which the PCIe link operates can be brought down (e.g., from GEN3 to GEN2/GEN1) allowing the voltage domain to be reduced to lower voltage levels (corners) (e.g., minimal operating level for low throughput applications that performs well below GEN2 or GEN1 speeds). The reduced voltage levels (corners) for the lower bandwidth use cases reduce power consumption.

By reducing the link speed (e.g., GEN speed) and/or link width during low throughput data traffic scenarios, aspects of the present disclosure give subsystems an opportunity to scale down voltage levels (e.g., to lower operating levels that satisfy current throughput requirements over the PCIe link). The scaled down one or more voltage levels reduce power consumption (e.g., reduce leakage currents during sustained low throughput traffic or in idle use case).

It is noted that the system 110 may be implemented within battery based consumer devices such as a wireless device (e.g., a mobile phone, user equipment (UE), mobile station (MS)). Furthermore, in the context of a UE, the PCIe root complex or host device might be an application processor or other processor within a UE, and the endpoint device may be on-board integrated circuits or clients such a wireless modem, a system on a chip (SOC), or an 802.11 WiFi radio device, as examples.

An exemplary PCIe system 205 in which aspects of the present disclosure may be implemented will now be discussed with reference to FIG. 2. This will be followed by a description of bandwidth-based power management methods according to aspects of the present disclosure.

The system 205 includes a host system 210 and a PCIe endpoint device system 250. The host system 210 may be integrated on a first chip (e.g., system on a chip), and the endpoint device system 250 may be integrated on a second chip. In this example, the host system 210 and the endpoint device system 250 are coupled by a PCIe link 285.

The host system 210 includes one or more host clients 214. Each host client 214 may be implemented on a processor executing software that performs the functions of the host client 214 discussed herein. For the example of more than one host client 214, the host clients 214 may be implemented on the same processor or different processors. The host system 210 also includes a host controller 212, which may perform root complex functions specified in the PCIe specification, as discussed further below. The host controller 212 may be implemented on a processor executing software that performs the functions of the host controller 212 discussed herein.

The host system 210 includes a PCIe interface circuit 216, a system bus interface 215, and system memory 240. The system bus interface 215 may interface the one or more host clients 214 with the host controller 212, and interface each of the one or more host clients 214 and the host controller 212 with the PCIe interface circuit 216 and the system memory 240. The PCIe interface circuit 216 provides the host system 210 with an interface to the PCIe link 285. In this regard, the PCIe interface 216 is configured to transmit data (e.g., from the host client 214) to the endpoint device 250 over the PCIe link 285 and receive data from the endpoint device 250 via the PCIe link 285, as discussed further below. The PCIe interface circuit 216 includes a PCIe controller 218, a digital PHY interface for the PCIe Architecture (PIPE) interface 220, a physical (PHY) transmit (TX) block 222, a PHY receive (RX) block 226, and a clock generator 224. The PIPE interface 220 provides a parallel interface between the PCIe controller 218 and the PHY TX block 222 and the PHY RX block 226. The PCIe controller 218 (which may be implemented in hardware) may be configured to perform transaction layer, data link layer, and control flow functions specified in the PCIe specification, as discussed further below.

The host system 210 also includes an oscillator (e.g., crystal oscillator or "XO") 230 configured to generate a stable reference clock signal 232. The reference clock signal 232 may have a frequency of 19.2 MHz in one example, but is not limited to such frequency. The reference clock signal 232 is input to the clock generator 224 which generates multiple clock signals based on the reference clock signal 232, as discussed further below. In this regard, the clock generator 224 may include multiple phase locked loops (PLLs), in which each PLL generates a respective one of the multiple clock signals by multiplying up the frequency of the reference clock signal 232.

The endpoint device system 250 includes one or more device clients 254. Each device client 254 may be implemented on a processor executing software that performs the functions of the device client 254 discussed herein. For the example of more than one device client 254, the device clients 254 may be implemented on the same processor or different processors. The endpoint device system 250 also includes a device controller 252. As discussed further below, the device controller 252 may be configured to receive bandwidth request(s) from one or more device clients, and determine whether to change the link speed (e.g., GEN speed) and/or link width based on the bandwidth request(s). The device controller 252 may be implemented on a processor executing software that performed the functions of the device controller discussed herein.

The endpoint device system 250 includes a PCIe interface circuit 260, a system bus interface 256, and system memory 274. The system bus interface 256 may interface the one or more device clients 254 with the device controller 252, and interface each of the one or more device clients 254 and device controller 252 with the PCI interface circuit 260 and the system memory 274. The PCIe interface circuit 260 provides the endpoint device system 250 with an interface to the PCIe link 285. In this regard, the PCIe interface circuit 260 is configured to transmit data (e.g., from the device client 254) to the host system 210 (also referred to as host device) over the PCIe link 285 and receive data from the host system 210 via the PCIe link 285, as discussed further below. The PCIe interface circuit 260 includes a PCIe controller 262, a PIPE interface 264, a physical (PHY) transmit (TX) block 266, a PHY receive (RX) block 270, and a clock generator 268. The PIPE interface 264 provides a parallel interface between the PCIe controller 262 and the PHY TX block 266 and the PHY RX block 270. The PCIe controller 262 (which may be implemented in hardware) may be configured to perform transaction layer, data link layer and control flow functions specified in the PCIe specification, as discussed further below.

The endpoint device system 250 also includes an oscillator (e.g., crystal oscillator) 272 configured to generate a stable reference clock signal 273 for the system memory 274. In the example in FIG. 2, the clock generator 224 at the host system 210 is configured to generate an endpoint (EP) reference clock signal 287, which is forwarded to the endpoint device system 250 via a differential clock line 288 by the PHY RX block 226. At the endpoint device system 250, the RX PHY block 270 receives the EP reference clock signal 287, and forwards the EP reference clock signal 278 to the clock generator 268. The EP reference clock signal 287 may have a frequency of 100 MHz, but is not limited to such frequency. The clock generator 268 is configured to generate multiple clock signals based on the EP reference clock signal 287, as discussed further below. In this regard, the clock generator 268 may include multiple PLLs, in which each PLL generates a respective one of the multiple clock signals by multiplying up the frequency of the EP reference clock signal 287.

The system 205 also includes a power management integrated circuit (PMIC) 290 coupled to a battery 292 and/or another power source. The PMIC 290 is configured to convert the voltage of the battery 292 into multiple supply voltages (e.g., using switch regulators, linear regulators, or any combination thereof). In this example, the PMIC 290 generates a voltage 242 for the oscillator 230, a voltage 244 for the PCIe controller 218, and a voltage 246 for the PHY blocks 222 and 226 and clock generator 224. The voltages 242, 244 and 246 may be programmable, in which the PMIC 290 is configured to set the voltage levels (corners) of the voltages 242, 244 and 246 according to instructions (e.g., from the host controller 212).

The PMIC 290 also generates a voltage 280 for the oscillator 272, a voltage 278 for the PCIe controller 262, and a voltage 276 for the PHY blocks 266 and 270 and clock generator 268. The voltages 280, 278 and 276 may be programmable, in which the PMIC 290 is configured to set the voltage levels (corners) of the voltages 280, 278 and 276 according to instructions (e.g., from the device controller 252). The PMIC 290 may be implemented on one or more chips. Although the PMIC 290 is shown as one PMIC in FIG. 2, it is to be appreciated that the PMIC 290 may be implemented by two or more PMICs. For example, the PMIC 290 may include a first PMIC for generating voltages 242, 244 and 246 and a second PMIC for generating voltages 280, 278 and 276. In this example, the first and second PMICs may both be coupled to the battery 292.

In operation, the PCIe interface circuit 216 on the host system 210 may transmit data from the one or more host clients 214 to the endpoint device system 250 via the PCIe link 285. The data from the one or more host clients 214 may be directed to the PCIe interface 216 according to a PCIe map set up by the host controller 212 during initial configuration. At the PCIe interface 216, the PCIe controller 218 may perform transaction layer and data link layer functions on the data such as packetizing the data, generating error correction codes to be transmitted with the data, etc. The PCIe controller 218 outputs the processed data to the PHY TX block 222 via the PIPE interface 220. The processed data includes the data from the one or more host clients 214 as well as overhead data (e.g., packet header, error correction code, etc.). In one example, the clock generator 224 may generate a 250 MHz clock 234 for GEN3 based on the reference clock 232, and input the 250 MHz clock 234 to the PCIe controller 218 to time operations of the PCIe controller 218. In this example, the PIPE interface 220 may include a 32-bit parallel bus that transfers 32-bits of data to the PHY TX block in parallel for each cycle of the 250 MHz clock 234, which translates to a transfer rate of approximately 8 GT/s.

The PHY TX block 222 serializes the parallel data from the PCIe controller 218 and drives the link 285 with the serialized data. In this regard, the PHY TX block 222 may include one or more serializers and one or more drivers. The clock generator 224 may generate a high-frequency clock for the one or more serializers based on the reference clock signal 232.

At the endpoint device system 250, the PHY RX block 270 receives the serialized data via the link 285, and deserializes the received data into parallel data. In this regard, the PHY RX block 270 may include one or more receivers and one or more deserializer. The clock generator 268 may generate a high-frequency clock for the one or more deserializers based on the EP reference clock signal 287. The PHY RX block 270 transfers the deserialized data to the PCIe controller 262 via the PIPE interface 264. The PCIe controller 262 may recover the data from the one or more host clients 214 from the deserialized data and forward the recovered data to the one or more device clients 254.

On the endpoint device system 250, the PCIe interface circuit 260 may transmit data from the one or more device clients 254 to the host system 250 via the link 285. In this regard, the PCIe controller 262 at the PCIe interface circuit 260 may perform transaction layer and data link layer functions on the data such as packetizing the data, generating error correction codes to be transmitted with the data, etc. The PCIe controller 262 outputs the processed data to the PHY TX block 266 via the PIPE interface 264. The processed data includes the data from the one or more device clients 254 as well as overhead data (e.g., packet header, error correction code, etc.). In one example, the clock generator 268 may generate a 250 MHz clock for GEN3 based on the EP reference clock 287, and input the 250 MHz clock to the PCIe controller 262 to time operations of the PCIe controller 262.

The PHY TX block 266 serializes the parallel data from the PCIe controller 262 and drives the link 285 with the serialized data. In this regard, the PHY TX block 266 may include one or more serializers and one or more drivers. The clock generator 268 may generate a high-frequency clock for the one or more serializers based on the EP reference clock signal 287.

At the host system 210, the PHY RX block 226 receives the serialized data via the link 285, and deserializes the received data into parallel data. In this regard, the PHY RX block 226 may include one or more receivers and one or more deserializer. The clock generator 224 may generate a high-frequency clock for the one or more deserializers based on the reference clock signal 232. The PHY RX block 226 transfers the deserialized data to the PCIe controller 218 via the PIPE interface 220. The PCIe controller 218 may recover the data from the one or more device clients 254 from the deserialized data and forward the recovered data to the one or more host clients 214.

Figure 2:
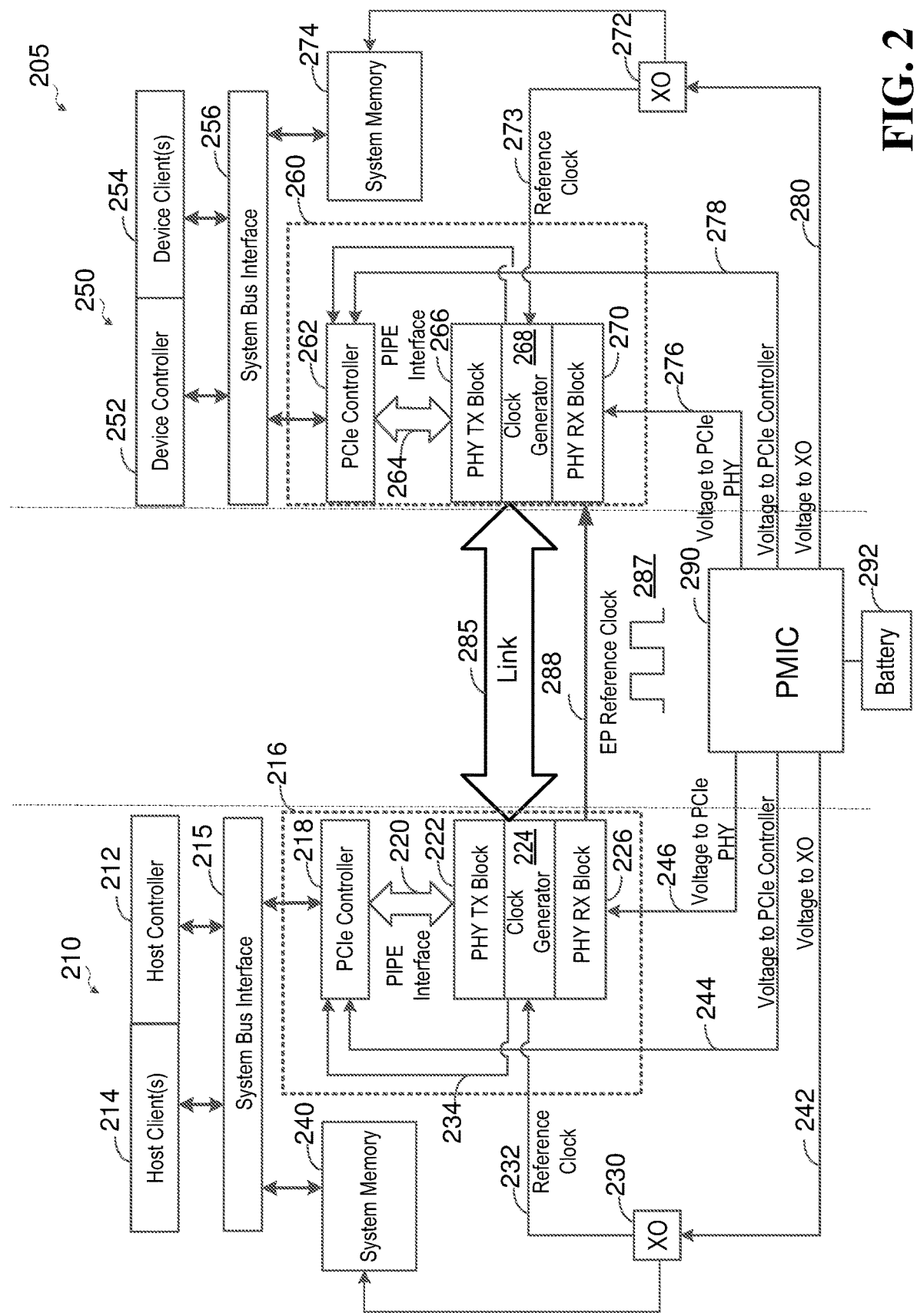
FIG. 2 shows an example of a system including a host system and an endpoint device system according to aspects of the present disclosure.
Figure 3:
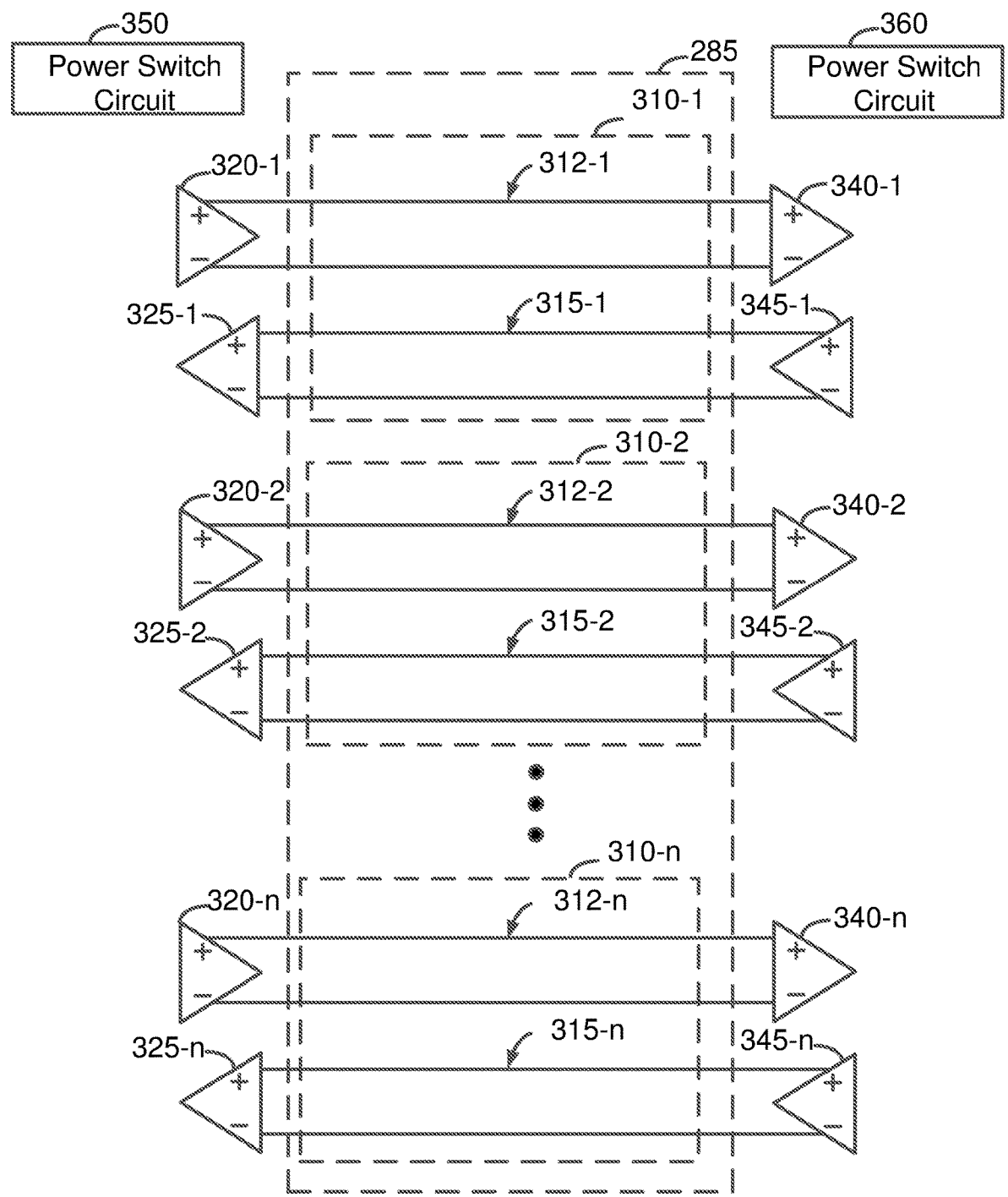
FIG. 3 shows an exemplary implementation of a link according to certain aspects of the present disclosure.

FIG. 3 shows an example of the PCIe link 285 that may be used in the system of FIG. 2 according to certain aspects of the present disclosure. In this example, the link 285 includes multiple lanes 310-1 to 310-$n$, in which each lane includes a respective first differential line 312-1 to 312-$n$ for sending data from the host system 210 to the endpoint device system 250, and a respective second differential line 315-1 to 315-$n$ for sending data from the endpoint device system 250 to the host system 210. Thus, each lane 310-1 to 310-$n$ is bidirectional. The differential lines 312-1 to 312-$n$ and 315-1 to 315-$n$ may be implemented with metal traces on a substrate (e.g., printed circuit board), in which the host system 210 may be integrated on a first chip mounted on the substrate and the endpoint device is integrated on a second chip mounted on the substrate. The differential lines 312-1 to 312-$n$ and 315-1 to 315-$n$ may also be implemented with wires, cables, etc. In this example, when data is sent from the host system 210 to the endpoint device system 250 across multiple lanes, the PHY TX block 222 may include logic for partitioning the data among the lanes. Similarly, when data is sent from the endpoint device system 250 to the host system 210 across multiple lanes, the PHY TX block 266 may include logic for partitioning the data among the lanes.

Based on the example in FIG. 3, the PHY TX block 222 shown in FIG. 2 may be implemented to include a driver 320-1 to 320-$n$ for each differential line 312-1 to 312-$n$ and the PHY RX block 270 shown in FIG. 2 may be implemented to include a receiver 340-1 to 340-$n$ (e.g., amplifier) for each differential line 312-1 to 312-$n$. Each driver 320-1 to 320-$n$ is configured to drive the respective differential line 312-1 to 312-$n$ with data and each receiver 340-1 to 340-$n$ is configured to receive data from the respective differential line 312-1 to 312-$n$. Also, in FIG. 3, the PHY TX block 266 may include a driver 345-1 to 345-$n$ for each differential line 315-1 to 315-$n$ and the PHY RX block 226 may include a receiver 325-1 to 325-$n$ (e.g., amplifier) for each differential line 315-1 to 315-$n$. Each driver 345-1 to 345-$n$ is configured to drive the respective differential line 315-1 to 315-$n$ with data and each receiver 325-1 to 325-$n$ is configured to receive data from the respective differential line 315-1 to 315-$n$.

In certain aspects, the width of the link 285 is scalable. In these aspects, the width of the link 285 is scaled by controlling the number of lanes 310-1 to 310-$n$ that are active. The larger the number of active lanes, the wider the width of the link 285, and the smaller the number of active lanes, the smaller the width of the link 285. In one example, the host controller 212 may configure the width of the link 285 by configuring the number of lanes 310-1 to 310-$n$ on which the PCIe interface circuit 216 and PCI interface circuit 260 transmit and/or receive data via the link 285.

In one example, the host system 210 may include a power switch circuit 350 configured to individually control power to the drivers 320-1 to 320-$n$ and the receivers 325-1 to 325-$n$ from the PMIC 290. In this regard, the power switch circuit 350 may couple the drivers and receivers of the active lanes to the voltage 246, and decouple the drivers and receivers of the inactive lanes from the voltage 246. In this example, the drivers 320 and receivers 325 of the inactive lanes are powered down to conserve power. Therefore, in this example, the number of drivers and receivers that are powered on scales with the width of the link 285. The power switch circuit 350 may be configured to selectively power the drivers 320-1 to 320-$n$ and receivers 325-1 to 325-$n$ based on instructions from the host controller 212, in which the host controller 212 instructs the power switch circuit 350 which drivers and receivers to power on or off (e.g., based on the current link width). For ease of illustration, the individual connections or couplings between the power switch circuit 350 and the drivers 320-1 to 320-$n$ and receivers 325-1 to 325-$n$ are not shown in FIG. 3.

Similarly, the endpoint device system 250 as was shown in FIG. 2 may include a power switch circuit 360 configured to individually control power to the drivers 340-1 to 340-$n$ and the receivers 345-1 to 345-$n$ from the PMIC 290. In this regard, the power switch circuit 360 may couple the drivers and receivers of the active lanes to the voltage 276, and decouple the drivers and receivers of the inactive lanes from the voltage 276. Thus, in this example, the drivers and receivers of the inactive lanes are powered down to conserve power. The power switch circuit 360 may be configured to selectively power the drivers 340-1 to 340-$n$ and receivers 345-1 to 345-$n$ based on instructions from the device controller 252, in which the device controller 252 instructs the power switch circuit 360 which drivers and receivers to power on or off (e.g., based on the current link width). For ease of illustration, the individual connections or couplings between the power switch circuit 360 and the drivers 340-1 to 340-$n$ and receivers 345-1 to 345-$n$ are not shown in FIG. 3.

The link 285 may support multiple link speeds. For example, the link 285 may support multiple link speeds corresponding to different generations ("GENs") of the PCIe standard. In this regard, Table 1 below lists an exemplary transfer speed per lane per direction for a GEN1 speed, a GEN2 speed, a GEN3 speed, a GEN4 speed and GEN5 speed.

TABLE 1

| Generation | Transfer Speed per Lane (giga-transfers per second) |
|---|---|
| GEN1 | 2.5 GT/s |
| GEN2 | 5 GT/s |
| GEN3 | 8 GT/s |
| GEN4 | 16 GT/s |
| GEN5 | 32 GT/s |

The exemplary transfer rates in Table 1 may be theoretical transfer rates. The actual transfer rates for one or more of the link speeds may be slightly lower than the transfer rates shown in Table 1. The transfer rates may also be expressed as Gbps. In this example, a link speed may refer to a transfer rate per lane per direction.

In the above example, the host controller 212 and the device controller 252 may negotiate a link speed (e.g., GEN speed), and configure the PCIe interface circuits 216 and 260 to operate at the negotiated link speed (e.g., per PCIe hardware programming guide). In this example, the host controller 212 may set one or more of the voltages 242, 244, and 246 based on the current link speed (current GEN speed). In one example, the host controller 212 may include a table mapping each supported link speed (e.g., each supported GEN speed) to one or more respective voltage levels (corners). In this example, the host controller 212 may instruct the PMIC 290 to set one or more of the voltages 242, 244 and 246 supplied by the PMIC 290 according to the one or more voltage levels (corners) mapped to the current link speed (e.g., current GEN speed). The voltage levels (corners) for a lower link speed may be lower than the voltage levels (corners) for a higher link speed (e.g., because of more relaxed timing requirements for the lower link speed). The host controller 212 may instruct the PMIC 290 directly or through another processor that communicates directly to the PMIC 290. Thus, in this example, the voltage levels (corners) of the host system 210 scale with link speed (e.g., GEN speed).

Similarly, the device controller 252 may set one or more of the voltages 280, 278 and 276 based on the current link speed (current GEN speed). In one example, the device controller 252 may include a table mapping each supported link speed (e.g., each supported GEN speed) to one or more respective voltage levels (corners). In this example, the device controller 252 may instruct the PMIC 290 to set one or more of the voltages 276, 278, and 280 supplied by the PMIC 290 according to the one or more voltage levels (corners) mapped to the current link speed (e.g., current GEN speed). The device controller 252 may instruct the PMIC 290 directly or through another processor that communicates directly to the PMIC 290. Thus, in this example, the voltage levels (corners) of the endpoint device system 250 scale with link speed (e.g., GEN speed).

Figure 4:
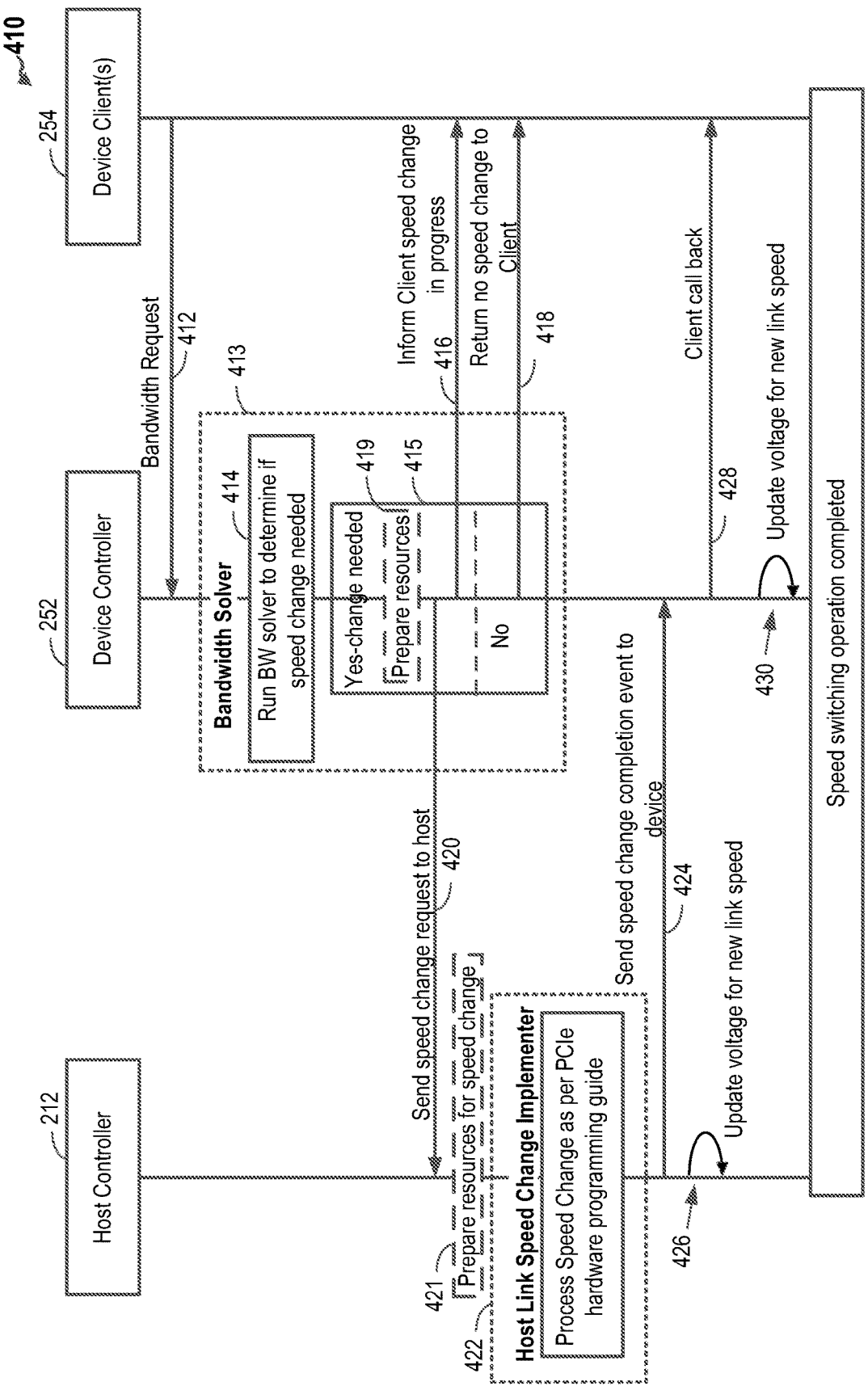
FIG. 4 is a call flow diagram showing an example of a bandwidth based power management method according to certain aspects of the present disclosure.

FIG. 4 shows a call flow diagram of an exemplary bandwidth based power management method 410 using link speed scaling according to aspects of the present disclosure. Method 410 may also include link width scaling according to further aspects. At 412, the device controller 252 (or also endpoint PCIe software processes) receives a bandwidth request from the one or more device clients 254 (or also endpoint PCIe client software processes). Each device client 254 may generate the respective bandwidth request based on the bandwidth requirement of the client. Each bandwidth request may be in any format. For example, each bandwidth request may indicate the bandwidth requirement of the respective device client 254 in terms of Mbps or another scale of bits per second. For the example in which the endpoint device system 250 includes multiple device clients 254, the device controller 252 may receive multiple bandwidth requests from the multiple device clients 254. In this example, the device controller 252 may aggregate the bandwidth requests (e.g., aggregate the bandwidth requirements indicated in the bandwidth requests).

The device controller 252 implements a bandwidth solver 413, which may be an algorithmic process executed within controller 252 or some hardware component of device controller 252, or combinations thereof, to determine whether to change the current link speed of the link 285 based on the bandwidth request (or aggregated bandwidth request for the case of multiple device clients 254). The bandwidth solver 413 may implement a decision process 414 to determine if a speed change for the link 285 is warranted, and also to effectuate scaling of either the link speed or link width. The process 414 may make the determination whether a speed change is warranted (either decreased or increased scaling of speed), or that no change is needed. This decision result is illustrated by block 415 where, if a change is needed, messages concerning the effectuation of speed change (e.g., 416 and 418) are sent to the controller 212 and device client(s) 254 (the portion of block 415 above the dashed line shown within the block) Otherwise, block 415 illustrates that when no speed change is warranted, a no speed change message 418 is returned to the device client(s) 254 (i.e., the portion of block 415 below the dashed line). In an example, the bandwidth solver 413 may determine to reduce the link speed from the current link speed to a lower link speed (e.g., change from GEN3 speed to GEN2 or GEN1 speed) if the bandwidth request (or aggregated bandwidth request) indicates a low bandwidth requirement that can be adequately served by the lower link speed or lower link width. In another example, the bandwidth solver 413 may determine to increase the link speed from the current link speed to a higher link speed (e.g., change from GEN1 or GEN2 speed to GEN3 speed) if the bandwidth request (or aggregated bandwidth request) indicates a high bandwidth requirement. As mentioned above, the bandwidth solver 413 may be implemented in software executed by the device controller 252 or some hardware logic that is part of or in communication with the device controller 252, or combinations thereof. Exemplary implementations of the bandwidth solver 413 are provided below.

If the bandwidth solver 413 determines no link speed change is needed, then the device controller 252 may send an indicator to the one or more device clients at 418 indicating no link speed change. If the bandwidth solver determines a link speed change, then the device controller 252 may send an indicator or message to the one or more device clients 254 at 416 indicating a link speed change. The indicator to the device client 254 may also indicate the new link speed or a PCIe generation.

If the bandwidth solver 413 determines a link speed change, then the device controller 252 sends a speed change request to the host controller 212 to change the link speed at 420. The request 420 may indicate the new link speed. For example, if the bandwidth solver determines to change from GEN1 or GEN2 speed to GEN3 speed, then the request to the host controller 212 may indicate GEN3 speed. The device controller 252 may send the request to the host controller 212 via the PCIe interface circuits 260 and 216 and the link 285.

According to a further aspect, it is noted that the bandwidth solver may also initiate preparing resources (e.g., system or power resources) for a speed change, including scaling up, in an option as indicated at block 419. Of note concerning the process in block 419, if required, the system resources or power resources including, but not limited to, a voltage regulator or a clock source, may be scaled up for higher link speed change requests. This scale up of power or system resources may be an aggregate of all the previous bandwidth change requests including the current request that are sent or being sent to the host and pending acknowledgement of a link speed change completion. Of still further note, this example merely illustrates one implementation of preparing the system or power resources for an outstanding link speed change request, but is not limited to such. After the speed change request is sent to the host as shown at 420, in another optional aspect, the host controller 212 may be configured to prepare the resources as shown at block 421 (e.g., prepare system or power resources, including but not limited to the voltage regulator and/or clock source) for a speed change, including a change to accommodate higher link speed change requests.

Additionally, in response to the request to change the link speed, the host controller 212 may initiate the link speed change using a link speed change implementer at 422. The link speed change implementer 422 may process the speed change per PCIe hardware programming guide in the PCIe specification, which may include performing link retraining and reconfiguring the PCIe interface circuits 216 and 260 for the new link speed. The link speed change implementer 422 may be implemented in software executed by the host controller 212, hardware associated with or part of controller 212, or combinations thereof.

When the link speed change process is completed, the host controller 212 may send the device controller 252 an indicator at 424 indicating speed change completion. At 426, the host controller 212 changes or updates the voltage levels (corners) of one or more of the voltages 242, 244, and 246, if needed, based on the new link speed. For example, if the new link speed is lower (e.g., change from GEN3 speed to GEN2 or GEN1 speed), then the host controller 212 may reduce the voltage levels (corners) of one or more of the voltages 242, 244 and 246. In another example, if the new link speed is higher (e.g., change from GEN2 or GEN1 speed to GEN3 speed), then the host controller 212 may increase the voltage levels (corners) of one or more of the voltages 242, 244 and 246. As discussed above, the host controller 212 may change the voltage levels (corners) of one or more of the voltages 242, 244 and 246 by instructing the PMIC 290 to set the voltage levels (corners) of one or more of the voltages 242, 244 and 246 supplied by the PMIC 290 based on the new link speed. If the voltage levels of the voltages 242, 244, and 246 for the new link speed are the same as for the previous link speed, then the device controller 252 may leave the voltage levels alone. The voltage scaling for the new link speed at 426 may be integrated with the link speed change process performed by the link speed change implementer 422 (i.e., the voltage scaling may be part of the link speed change process).

At 428, in response to the speed change completion indication from the host controller 212, the device controller 252 may send an indicator 428 to the one or more device clients 254 informing the one or more device clients 254 of the link speed change.

At 430, the device controller 252 updates the voltage levels (corners) of one or more of the voltages 276, 278 and 280 if needed based on the new link speed. For example, if the new link speed is lower (e.g., change from GEN3 speed to GEN2 or GEN1 speed), then the device controller 252 may reduce the voltage levels (corners) of one or more of the voltages 276, 278, and 280. In another example, if the new link speed is higher (e.g., change from GEN2 or GEN1 speed to GEN3 speed), then the device controller 252 may increase the voltage levels (corners) of one or more of the voltages 276, 278, and 280. As discussed above, the device controller 252 may change the voltage levels (corners) of one or more of the voltages 276, 278, and 280 by instructing the PMIC 290 to set the voltage levels (corners) of one or more of the voltages 276, 278 and 280 supplied by the PMIC 290 based on the new link speed. If the voltage levels of the voltages 276, 278 and 280 for the new link speed are the same as for the previous link speed, then the device controller 252 may leave the voltage levels alone.

Thus, for a low bandwidth use case, the exemplary power management method 410 reduces the link speed (e.g., GEN speed), which gives the host controller 212 and the device controller 252 an opportunity to scale down one or more voltage levels of the system 205 (e.g., to lower operating levels that satisfy current throughput requirements over the link 285). The scaled down one or more voltage levels reduce power consumption (e.g., reduce leakage currents during sustained low throughput traffic or in idle use case).

In the example shown in FIG. 4, the bandwidth solver is implemented at the endpoint device side. However, it is to be appreciated that the present disclosure is not limited to this example. For example, the bandwidth solver may also be implemented on the host side according to certain aspects. In this regard, FIG. 5 illustrates a call flow diagram showing an exemplary bandwidth based power management method 510 in which the bandwidth solver is implemented on the host side according to aspects of the present disclosure.

At 512, the host controller 212 receives a bandwidth request from the one or more host clients 214. Each host client 214 may generate the respective bandwidth request based on the bandwidth requirement of the client. Each bandwidth request may be in any format (e.g., indicate the bandwidth requirement of the respective client in terms of Mbps or another scale of bits per second). For the example in which the host system 210 includes multiple clients 214, the host controller 212 may receive multiple bandwidth requests from the multiple clients 214. In this example, the host controller 212 may aggregate the bandwidth requests (e.g., aggregate the bandwidth requirements indicated in the bandwidth requests).

At 514, the host controller 212 implements a bandwidth solver 513 to determine whether to change the current link speed of the link 285 based on the bandwidth request (or aggregated bandwidth request for the case of multiple host clients). For example, the bandwidth solver may determine to reduce the link speed from the current link speed to a lower link speed (e.g., change from GEN3 speed to GEN2 or GEN1 speed) if the bandwidth request (or aggregated bandwidth request) indicates a low bandwidth requirement that can be adequately served at the lower link speed. In another example, the bandwidth solver may determine to increase the link speed from the current link speed to a higher link speed (e.g., change from GEN1 or GEN2 speed to GEN3 speed) if the bandwidth request (or aggregated bandwidth request) indicates a high bandwidth requirement. Exemplary implementations of the bandwidth solver are provided below. The bandwidth solver 513 may be implemented in software executed by the host controller 212, by hardware associated with the host controller 212, or by some combination thereof.

If the bandwidth solver 513 determines no link speed change is needed, then the host controller 212 may send an indicator to the one or more host clients at 518 indicating no link speed change. If the bandwidth solver determines a link speed change, then the host controller 212 may send an indicator to the one or more host clients 214 at 516 indicating a link speed change. The indicator may also indicate the new link speed. If the bandwidth solver 513 determines a link speed change, then the host controller 212 may send a link speed change request to the device controller 252 informing the device controller 252 of the proposed link speed change at 520. The request may indicate the new link speed. Of note, after the host controller 212 sends the message in step 520, the host controller 212 may be configured to wait for a response from the device controller 252. In response to the request, the device controller 252 may send an acknowledgement (ACK) to the host controller 212 indicating that the device controller 252 is ready for the link speed change as shown at 521. If the endpoint device does not support the new link speed, then the device controller 524 may send a negative acknowledgement (NACK) to the host controller 212 indicating to the host controller 212 that the endpoint device does not support the proposed link speed change request from the host controller 212. If the host controller 212 receives the NACK from the device controller 252, then the host controller 212 may abort the link speed change.

In an alternative, it is also noted that after receiving the message 520, the device controller 252 may be configured to initiate a scale up of system or power resources including, but not limited to, a voltage regulator or a clock source (e.g., PMIC 290 or clock generator 268) for higher link speed change requests as shown at block 540. Additionally, after receiving the ACK message 521, the host controller 212 may also be configured to then "scale up the system or power resources (e.g., PMIC 290 or clock generator 224) to accommodate higher link speed change requests as shown at block 542.

If the bandwidth solver 513 determines to change the link speed, then the host controller 212 may initiate the link speed change using a link speed change implementer at 522. The link speed change implementer 522 may process the speed change per PCIe hardware programming guide in the PCIe specification, which may include performing link retraining and reconfiguring the PCIe interface circuits 216 and 260 for the new link speed. The link speed change implementer may be implemented in software executed by the host controller 212.

When the link speed change process is completed, the host controller 212 may send an indicator to the one or more host clients 214 at 524 informing the one or more host clients 214 of the link speed change. The host controller 212 may also send an indicator to the device controller 252 at 526 indicating speed change completion.

At 528, the host controller 212 updates the voltage levels (corners) of one or more of the voltages 242, 244, and 246 if needed based on the new link speed. For example, if the new link speed is lower (e.g., change from GEN3 speed to GEN2 or GEN1 speed), then the host controller 212 may reduce the voltage levels (corners) of one or more of the voltages 242, 244 and 246. In another example, if the new link speed is higher (e.g., change from GEN2 or GEN1 speed to GEN3 speed), then the host controller 212 may increase the voltage levels (corners) of one or more of the voltages 242, 244 and 246. If the voltage levels of the voltages 242, 244, and 246 for the new link speed are the same as for the previous link speed, then the host controller 212 may leave the voltage levels alone. The voltage scaling for the new link speed at 528 may be integrated with the link speed change process performed by the link speed change implementer 522 (i.e., the voltage scaling may be part of the link speed change process).

At 530, the device controller 252 updates the voltage levels (corners) of one or more of the voltages 276, 278, and 280 if needed based on the new link speed. For example, if the new link speed is lower (e.g., change from GEN3 speed to GEN2 or GEN1 speed), then the device controller 252 may reduce the voltage levels (corners) of one or more of the voltages 276, 278 and 280. In another example, if the new link speed is higher (e.g., change from GEN2 or GEN1 speed to GEN3 speed), then the device controller 252 may increase the voltage levels (corners) of one or more of the voltages 276, 278 and 280. If the voltage levels of the voltages 276, 278, and 280 for the new link speed are the same as for the previous link speed, then the device controller 252 may leave the voltage levels alone.

The bandwidth solver 513 may be implemented in any one of a number of ways to convert a bandwidth requirement from one of more clients (e.g., one or more host clients, one or more device clients, etc.) and convert the bandwidth requirement into one of the following link parameters: PCIe link speed only; PCIe link width only; and PCI link speed and link width. For the case of multiple clients, the bandwidth requirement may be the aggregate of the bandwidth requirements of the multiple clients. The bandwidth solver may also take into account additional parameters such as burst frequency. FIGS. 4 and 5 discussed above illustrate examples in which the bandwidth solver converts the bandwidth requirement for one of more clients into a link speed.

The bandwidth solver 513 may be implemented in any one of a number of ways to convert a bandwidth requirement into a link speed and/or link width. Exemplary implementations of the bandwidth solver are discussed below. However, it is to be appreciated that the bandwidth solver is not limited to these examples, and may be extended to other implementations based on system power budget.

Figure 6A:
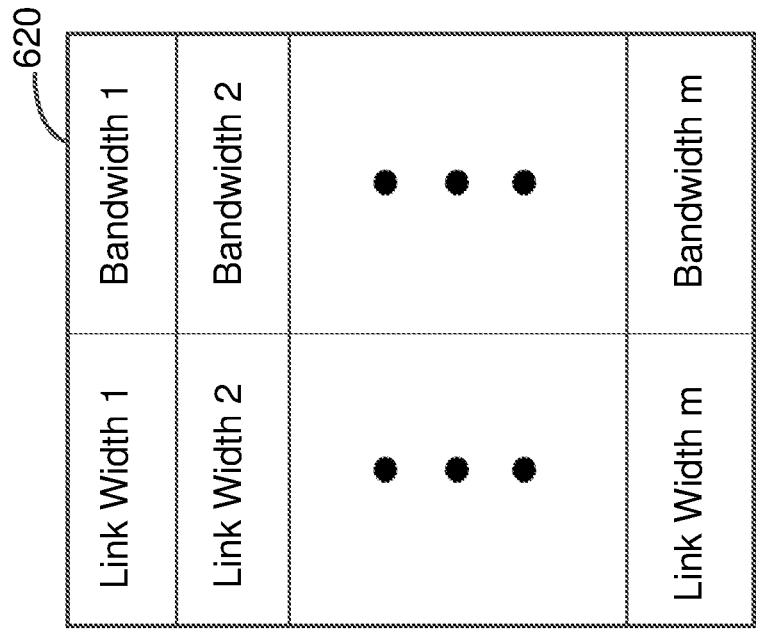
FIG. 6A shows an example of a lookup table mapping bandwidth requirement to link speed according to certain aspects of the present disclosure.

In certain aspects, the bandwidth solver 513 may convert a bandwidth requirement into a PCIe link parameter by looking up a table and determining a link speed and/or link width based on the bandwidth requirement using the table. FIG. 6A shows an example of a lookup table 610 for converting the bandwidth requirement (aggregate bandwidth requirement for the case of multiple clients) into a link speed (e.g., GEN speed). In this example, the table 610 includes different bandwidths (labeled "Bandwidth 1" to "Bandwidth m") and a corresponding link speed (labeled "Link Speed 1" to "Link Speed m") for each of the bandwidths. The bandwidths may be in Mbps or another format. Thus, the table 610 maps each bandwidth to the corresponding link speed. It is to be appreciated that two or more bandwidths may map to the same link speed. It is also to be appreciated that each bandwidth entry in the table by be a range of bandwidths that map to the same link speed.

The table 610 may be prestored in memory coupled to the bandwidth solver. When the bandwidth solver receives a bandwidth requirement from one or more clients, the bandwidth solver may convert the bandwidth requirement (aggregate bandwidth requirement for the case of multiple clients) into a link speed by looking up the link speed in the table 610 that maps to the bandwidth requirement. For example, if the bandwidth requirement (aggregate bandwidth requirement for the case of multiple clients) corresponds to Bandwidth 1 in the table 610, then the bandwidth solver may convert the bandwidth requirement into Link Speed 1. If the corresponding link speed in the table 610 is different from the current link speed, then the device controller 252 or host controller 212 may initiate a link speed change to the corresponding link speed from the table 610, as discussed above.

The table 610 may be generated based on computer simulations of the system 205 and/or power measurements of the system 205 for various bandwidth and link speed scenarios. In this example, the link speed that results in the lowest power for a particular bandwidth based on simulation results and/or power measurements may be mapped to the bandwidth in the table 610. Thus, the table 610 may be populated based on simulation results and/or power measurements, and then stored in memory accessible by the bandwidth solver.

Figure 6B:
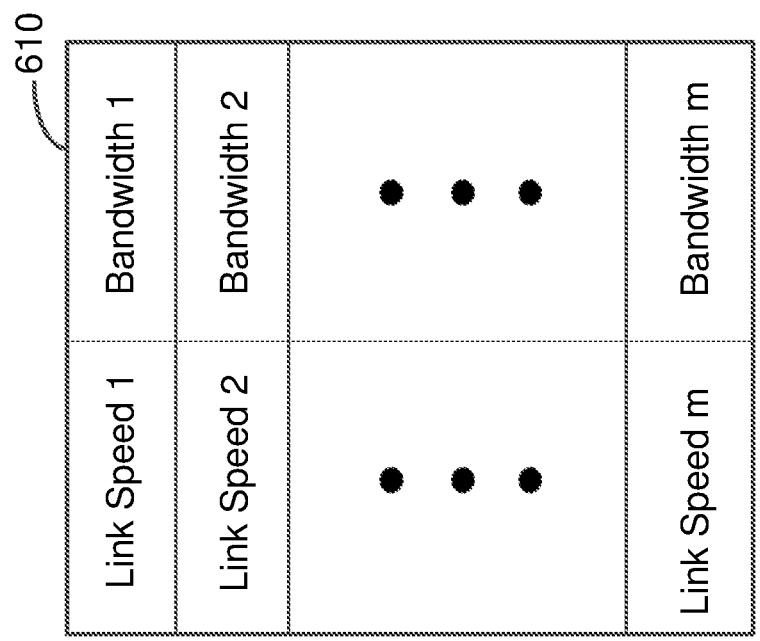
FIG. 6B shows an example of a lookup table mapping bandwidth requirement to link width according to certain aspects of the present disclosure.

FIG. 6B shows an example of a lookup table 620 for converting the bandwidth requirement (aggregate bandwidth requirement for the case of multiple clients) into a link width. In this example, the table 620 includes different bandwidths (labeled "Bandwidth 1" to "Bandwidth m") and a corresponding link width (labeled "Link Width 1" to "Link Width m") for each of the bandwidths. Thus, the table 620 maps each bandwidth to the corresponding link width. It is to be appreciated that two or more bandwidths may map to the same link width. It is also to be appreciated that each bandwidth entry in the table by be a range of bandwidths that map to the same link width. In one example, the link width may be specified by the number of active lanes in the link 285 corresponding to the link width. As discussed above with reference to FIG. 3, the larger the number of active lanes in the link 285, the wider the width of the link 285.

In one example, the table 620 may be generated for each supported link speed and prestored in memory coupled to the bandwidth solver. Thus, in this example, each link speed may have a corresponding table 620. In this example, the bandwidth solver may use the table 620 corresponding to the current link speed.

When the bandwidth solver receives a bandwidth requirement from one or more clients, the bandwidth solver may convert the bandwidth requirement (aggregate bandwidth requirement for the case of multiple clients) into a link width by looking up the link width in the table 620 that maps to the bandwidth requirement. For example, if the bandwidth requirement (aggregate bandwidth requirement for the case of multiple clients) corresponds to Bandwidth 1 in the table 620, then the bandwidth solver may convert the bandwidth requirement into Link Width 1. If the corresponding link width in the table 620 is different from the current link width, then the device controller 252 or host 212 controller may initiate a link width change to the corresponding link width from the table 620, as discussed further below.

The table 620 may be generated based on computer simulations of the system 205 and/or power measurements of the system 205 for various bandwidth and link width scenarios. In this example, the link width that results in the lowest power for a particular bandwidth based on simulation results and/or power measurements may be mapped to the bandwidth in the table 620. Thus, the table 620 may be populated based on simulation results and/or power measurements, and then stored in memory accessible by the bandwidth solver.

For the example in which the bandwidth solver is implemented on the endpoint device side, if the bandwidth solver determines a link width change, then the device controller 252 may send a link width change request to the host controller 212. In response, the host controller 212 may process the width change per PCIe hardware programming guide in the PCIe specification, which may include performing link retraining and reconfiguring the PCIe interface circuits 216 and 260 for the new link width. The host controller 212 may inform the device controller 252 when the link width change is complete.

In this example, if the link width is decreased, then the host controller 212 may power down the drivers in the PHY TX block 222 and/or the receivers in the PHY RX block 226 corresponding to the lanes in the link 285 that are being deactivated because of the link width change. As discussed above, the host controller 212 may power down selected drivers and/or receivers by sending instructions to the power switch circuit 350 to turn off the selected drivers and/or receivers. In other words, the host controller 212 sets the number of drivers and/or receivers that are powered by the power switch circuit 350 based on the new link width.

Similarly, the device controller 252 may power down the drivers in the PHY TX block 266 and/or the receivers in the PHY RX block 270 corresponding to the lanes in the link 285 that are being deactivated because of the link width change. As discussed above, the device controller 252 may power down selected drivers and/or receivers by sending instructions to the power switch circuit 360 to turn off the selected drivers and/or receivers. In other words, the device controller 252 sets the number of drivers and/or receivers that are powered by the power switch circuit 360 based on the new link width. Thus, components associated with the lanes being deactivated because of the link width change may be powered down to conserve power.

For the example in which the bandwidth solver is implemented on the host side, if the bandwidth solver determines a link width change, then the host controller 212 may process the width change per PCIe hardware programming guide in the PCIe specification, which may include performing link retraining and reconfiguring the PCIe interface circuits 216 and 260 for the new link width. The host controller 212 may also inform the device controller 252 of the link width change.

In this example, if the link width is decreased, then the host controller 212 may power down the drivers in the PHY TX block 222 and/or the receivers in the PHY RX block 226 corresponding to the lanes in the link 285 that are being deactivated because of the link width change. Similarly, the device controller 252 may power down the drivers in the PHY TX block 266 and/or the receivers in the PHY RX block 270 corresponding to the lanes in the link 285 that are being deactivated because of the link width change.

Figure 6C:
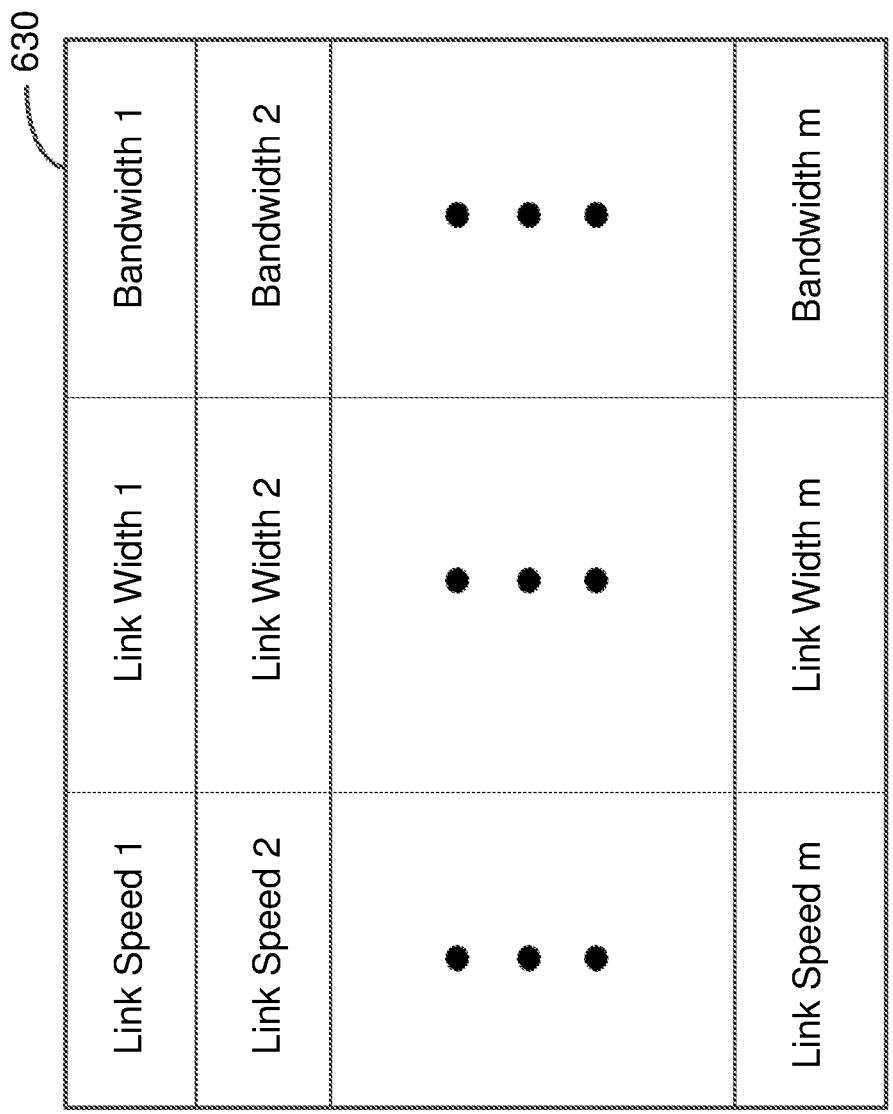
FIG. 6C shows an example of a lookup table mapping bandwidth requirement to link speed and link width according to certain aspects of the present disclosure.

FIG. 6C shows an example of a lookup table 630 for converting the bandwidth requirement into both a link speed (e.g., GEN speed) and a link width. In this example, the table 630 includes different bandwidths (labeled "Bandwidth 1" to "Bandwidth m") and a corresponding link speed (labeled "Link Speed 1" to "Link Speed m") and link width (labeled "Link Width 1" to "Link Width m") for each of the bandwidths. The bandwidths may be in Mbps or another format. Thus, the table 630 maps each bandwidth to the corresponding link speed and link width. It is to be appreciated that two or more bandwidths may map to the same link speed and/or same link width.

The table 630 may be prestored in memory coupled to the bandwidth solver. When the bandwidth solver receives a bandwidth requirement from one or more clients, the bandwidth solver may convert the bandwidth requirement (aggregate bandwidth requirement for the case of multiple clients) into a link speed and link width by looking up the link speed and link width in the table 630 that maps to the bandwidth requirement. If the corresponding link speed in the table 630 is different from the current link speed, then the device controller 252 or host controller 212 may initiate a link speed change to the corresponding link speed from the table 630, as discussed above. If the corresponding link width in the table 630 is different from the current width speed, then the device controller 252 or host controller 212 may initiate a link width change to the corresponding link width from the table 630, as discussed above. Thus, the link speed may be changed, the link width may be changed, or both the link speed and link width may be changed.

The table 630 may be generated based on computer simulations of the system 205 and/or power measurements of the system 205 for various bandwidth, link speed and link width scenarios. In the example, the link speed and link width that result in the lowest power for a particular bandwidth based on simulation results and/or power measurements may be mapped to the bandwidth in the table 630. Thus, the table 630 may be populated based on simulation results and/or power measurements, and then stored in memory accessible by the bandwidth solver.

In certain aspects, a power budget can be prepared by experiments or simulations for various link configurations (e.g., various link speeds and link widths) by varying link parameters, such as, but not limited to, the following: L0 power consumption; L0s power consumption; L1 power consumption; L1ss power consumption; L0s entry time; L1 entry time; L1ss entry time; L0s exit latency; L1 exit latency; and L1ss exit latency. In these aspects, the bandwidth solver can then choose the link speed and link width that has the lowest power consumption.

Figure 7:
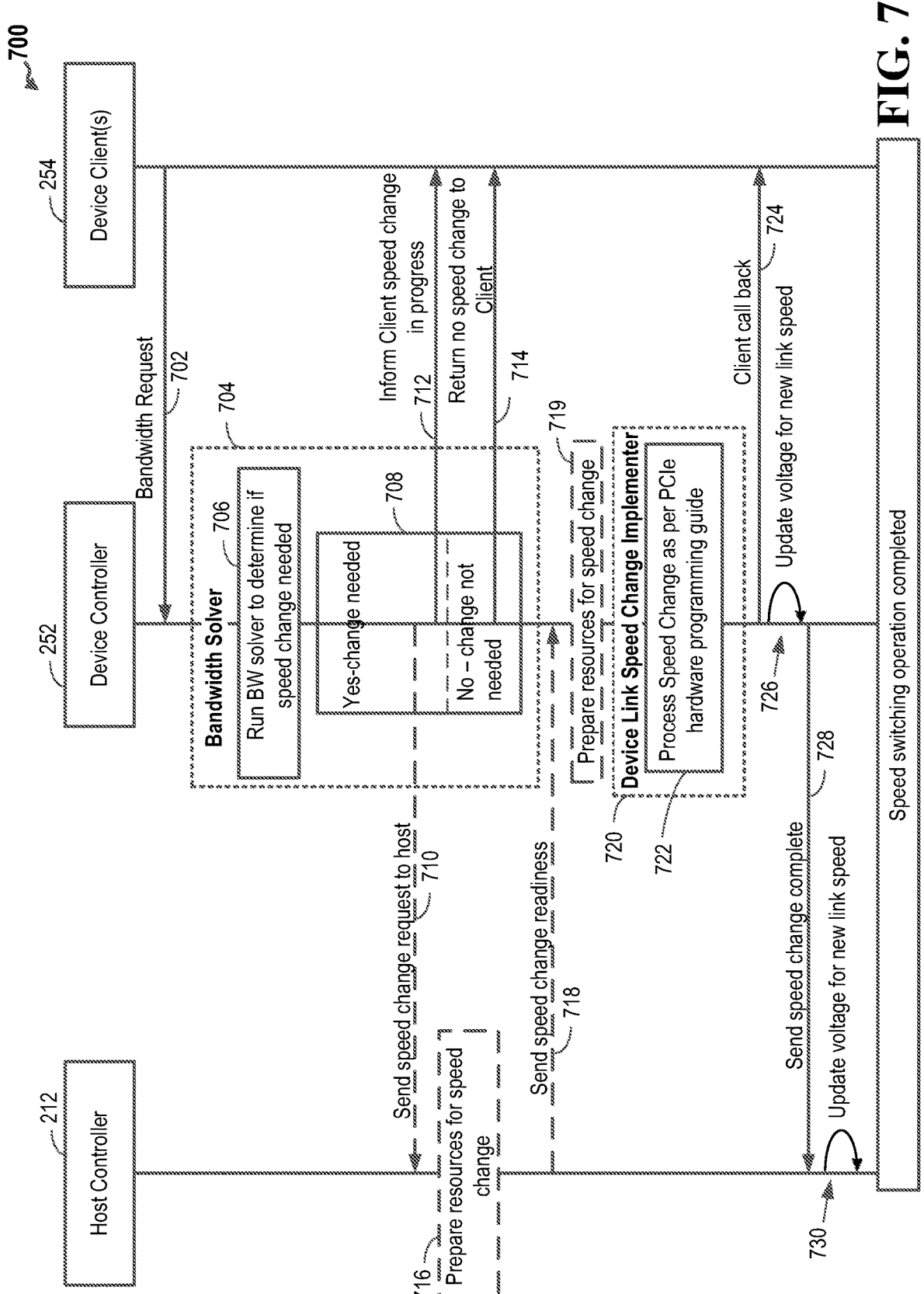
FIG. 7 is a call flow diagram showing yet another example of a bandwidth based power management method according to certain aspects of the present disclosure.

FIG. 7 illustrates another call flow diagram of an exemplary bandwidth based power management method 700 using link speed scaling according to aspects of the present disclosure. In particular, the method 710 relates to a scenario where a device client(s) 254 initiates speed scaling and the speed change is also completed, processed, and or implemented by the device side controller 252 in coordination with the host controller 212. Method 700 may also include link width scaling according to further aspects.

At 702, one or more device clients 254 (or also endpoint PCIe client software processes) send a bandwidth request to the device controller 254 (or also endpoint PCIe software processes). Each device client 254 may generate the respective bandwidth request based on the bandwidth requirement of the client and may be in any format. For example, each bandwidth request may indicate the bandwidth requirement of the respective device client 254 in terms of Mbps or another scale of bits per second. As a further example in which the endpoint device system 250 includes multiple device clients 254, the device controller 252 may receive multiple bandwidth requests from the multiple device clients 254. In this example, the device controller 252 may aggregate the bandwidth requests (e.g., aggregate the bandwidth requirements indicated in the bandwidth requests).

The device controller 252 implements a bandwidth solver 704, which may be an algorithmic process executed within device controller 252 or some hardware component of device controller 252, or combinations thereof, to determine whether to change the current link speed of the link (e.g., link 285 as shown in FIG. 2) based on the bandwidth request (or aggregated bandwidth request for the case of multiple device clients 254). The bandwidth solver 704 may implement a decision process 706 to determine if a speed change for the link 285 is warranted, and also to effectuate scaling of either the link speed or link width. The process 706 may make the determination whether a speed change is warranted (either decreased or increased scaling of speed), or that no change is needed. This decision result is illustrated by block 708 where, if a change is needed, messages concerning the effectuation of speed change (e.g., optional message 710 and message 712) may be sent to the host controller 212 and device client(s) 254 (See e.g., the portion of block 708 above the dashed line shown within the block) Otherwise, block 708 illustrates that when no speed change is warranted, a no speed change message 714 is returned to the device client(s) 254 (i.e., the portion of block 708 below the dashed line).

In an example, the bandwidth solver 704 may determine to reduce the link speed from the current link speed to a lower link speed (e.g., change from GEN3 speed to GEN2 or GEN1 speed) if the bandwidth request (or aggregated bandwidth request) indicates a low bandwidth requirement that can be adequately served by the lower link speed or lower link width. In another example, the bandwidth solver 704 may determine to increase the link speed from the current link speed to a higher link speed (e.g., change from GEN1 or GEN2 speed to GEN3 speed) if the bandwidth request (or aggregated bandwidth request) indicates a high bandwidth requirement. As mentioned above, the bandwidth solver 704 may be implemented in software executed by the device controller 252 or some hardware logic that is part of or in communication with the device controller 252, or combinations thereof.

If the bandwidth solver 704 determines a link speed change, then the device controller 252 may send an indicator or message to the one or more device clients 254 at 712 indicating a link speed change by informing the one or more device clients 254 that a speed change is in process. The message 712 to the device client 254 may also indicate the new link speed or a PCIe generation. Additionally, if the bandwidth solver 704 determines a link speed change, then the device controller 252 may optionally send a speed change request to the host controller 212 to request a change in the link speed as shown by message 710. The request 710 may indicate the new link speed. For example, if the bandwidth solver determines to change from GEN1 or GEN2 speed to GEN3 speed, then the request to the host controller 212 may indicate GEN3 speed. The device controller 252 may send the request to the host controller 212 via the PCIe interface circuits 260 and 216 and the link 285. In turn, the host controller 212 may prepare the voltage (e.g., voltage corner) for the speed change as indicated at block 716 and then send a speed change readiness message 718 back to the device controller252. Additionally, a process for preparing system or power resources for a speed change may be implemented in the device controller 252, as shown by block 719.

According to a further optional aspect, it is noted that the bandwidth solver 704 may also initiate scaling up in an option. That is, if required, the system resources or power resources including, but not limited to, a voltage regulator or a clock source, may be scaled up for higher link speed change requests. This scale up of power or system resources may be an aggregate of all the previous bandwidth change requests including the current request that are sent or being sent to the host and pending acknowledgement of a link speed change completion.

After the bandwidth solver 704 determines that a speed change is warranted at block 708, a device link speed change implementer 720 may be run in the device controller 252 to implement the speed change in the device controller 252 for the one or more device clients 254. Additionally, in response to the request to change the link speed, the device controller 252 through the device speed change implemented 720 may initiate in some aspects. The device link speed change implementer 720 may process the speed change per PCIe hardware programming guide in the PCIe specification as shown in block 722, which may include performing link retraining and reconfiguring the PCIe interface circuits 216 and 260 for the new link speed. The device link speed change implementer 720 may be implemented in software executed by the device controller 252, hardware associated with or part of controller 252, or combinations thereof.

When the device speed change process is completed, the device controller 252 may send an indicator call back message to the client device at 724 indicating speed change completion. At 726, the device controller 252 changes or updates the voltage levels (corners) of one or more of the voltages 276, 278, or 280, if needed, based on the new device link speed. For example, if the new device link speed is lower (e.g., change from GEN3 speed to GEN2 or GEN1 speed), then the device controller 252 may reduce the voltage levels (corners) of one or more of the voltages 276, 278, or 280. In another example, if the new device link speed is higher (e.g., change from GEN2 or GEN1 speed to GEN3 speed), then the device controller 252 may increase the voltage levels (corners) of one or more of the voltages 276, 278, or 280. As discussed above, the device controller 252 may change the voltage levels (corners) of one or more of the voltages 276, 278, or 280 by instructing the PMIC 290 to set the voltage levels (corners) of one or more of the voltages 276, 278, or 280 supplied by the PMIC 290 based on the new device link speed. If the voltage levels of the voltages 276, 278, or 280 for the new device link speed are the same as for the previous device link speed, then the device controller 252 may leave the voltage levels alone. The voltage scaling for the new link speed at 726 may be integrated with the device link speed change process performed by the device link speed change implementer 720 (i.e., the voltage scaling may be part of the device link speed change process).

At 728, in response to the speed change completion indication from the host controller 212, the device controller 252 may send message 728 to the host controller 212 informing the host controller 212 of the device speed change. At 730, host controller 212 updates the voltage levels (corners) of one or more of the voltages 242, 244, or 246 if needed based on the new link speed. For example, if the new link speed is lower (e.g., change from GEN3 speed to GEN2 or GEN1 speed), then the host controller 212 may reduce the voltage levels (corners) of one or more of the voltages 242, 244, or 246. In another example, if the new link speed is higher (e.g., change from GEN2 or GEN1 speed to GEN3 speed), then the host controller 212 may increase the voltage levels (corners) of one or more of the voltages 242, 244, or 246. As discussed above, the host controller 212 may change the voltage levels (corners) of one or more of the voltages 242, 244, or 246 by instructing the PMIC 290 to set the voltage levels (corners) of one or more of the voltages 242, 244, or 246 supplied by the PMIC 290 based on the new device link speed. If the voltage levels of the voltages 242, 244, or 246 for the new device link speed are the same as for the previous link speed, then the host controller 212 may leave the voltage levels alone.

Figure 8:
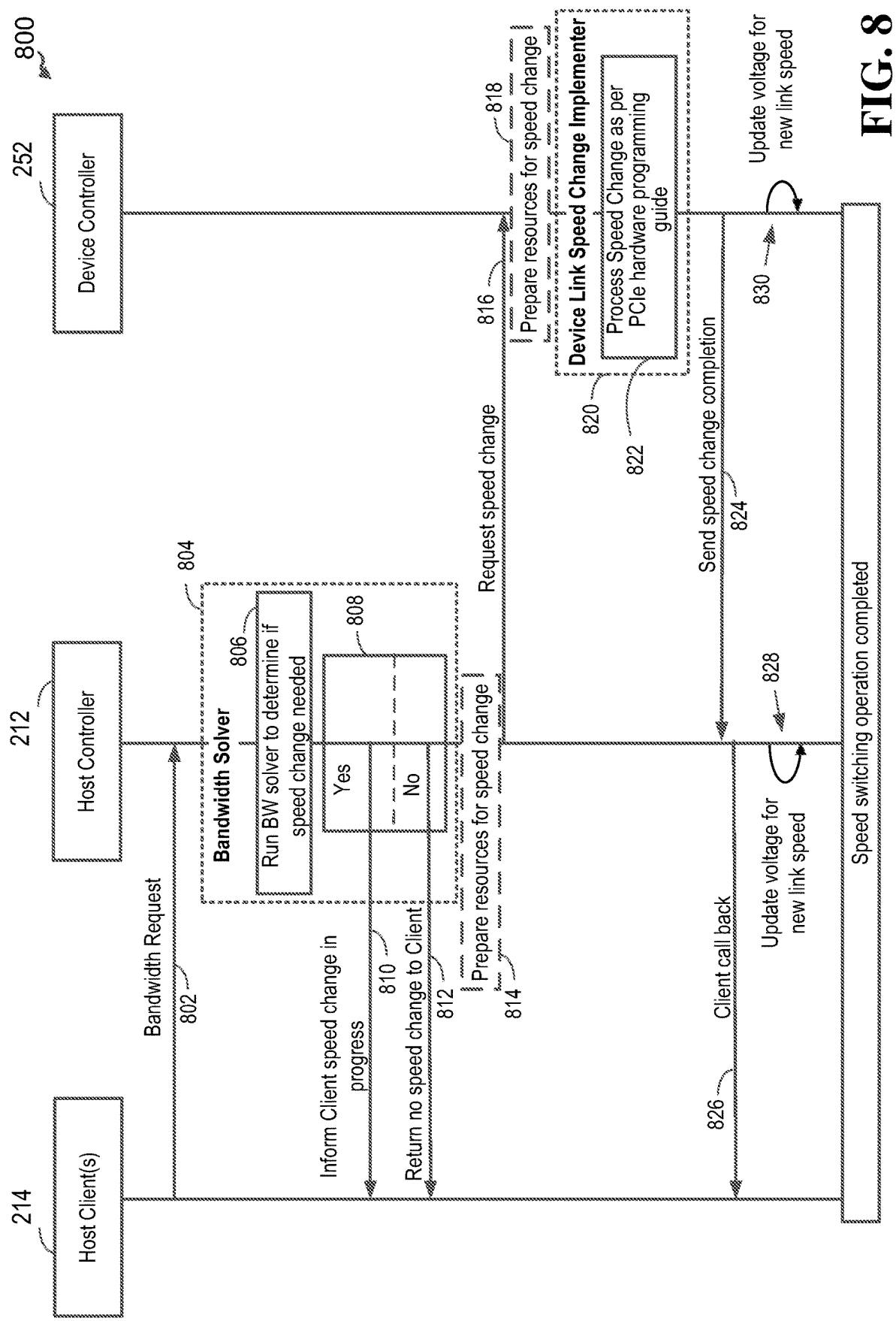
FIG. 8 is a call flow diagram showing still another example of a bandwidth based power management method according to certain aspects of the present disclosure.

According to another example, FIG. 8 illustrates a call flow diagram of a method 800 wherein a host client may initiate the bandwidth change request and the device controller completes, implements, or effectuates the link speed change. At 802, the host controller 212 receives a bandwidth request from the one or more host clients 214. Each host client 214 may generate the respective bandwidth request based on the bandwidth requirement of the host client. Each bandwidth request may be in any format (e.g., indicate the bandwidth requirement of the respective client in terms of Mbps or another scale of bits per second). For the example in which the host system 210 includes multiple clients 214, the host controller 212 may receive multiple bandwidth requests from the multiple clients 214. In this example, the host controller 212 may aggregate the bandwidth requests (e.g., aggregate the bandwidth requirements indicated in the bandwidth requests).

The host controller 212 implements a bandwidth solver 804 to determine whether to change the current link speed of the link 285 based on the bandwidth request (or aggregated bandwidth request for the case of multiple host clients) as shown at 806. For example, the bandwidth solver 804 may determine to reduce the link speed from the current link speed to a lower link speed (e.g., change from GEN3 speed to GEN2 or GEN1 speed) if the bandwidth request (or aggregated bandwidth request) indicates a low bandwidth requirement that can be adequately served at the lower link speed. In another example, the bandwidth solver 804 may determine to increase the link speed from the current link speed to a higher link speed (e.g., change from GEN1 or GEN2 speed to GEN3 speed) if the bandwidth request (or aggregated bandwidth request) indicates a high bandwidth requirement. Exemplary implementations of the bandwidth solver 804 are provided below. The bandwidth solver 804 may be implemented in software executed by the host controller 212, by hardware associated with the host controller 212, or some combination thereof.

If the bandwidth solver 804 determines no link speed change is needed, then the host controller 212 may send an indicator to the one or more host clients at 518 indicating no link speed change. If the bandwidth solver determines a link speed change, then the host controller 212 may send an indicator to the one or more host clients 214 at 810 indicating a link speed change. The indicator 810 may also indicate the new link speed. Alternatively, if the bandwidth solver 804 determines that no speed change is needed, a message 812 may be sent to the hots client(s) 214 to indicate no speed change.

If the bandwidth solver 804 determines a link speed change, the host controller 212 may optionally prepare system resources (e.g., prepare the voltage corner or clocks) for the speed change as shown at block 814. Additionally, the host controller 212 may send a link speed change request to the device controller 252 requesting the proposed link speed change at 816. The request 816 may indicate the new link speed. In response, the device controller 252 may optionally prepare the system resources (e.g., a voltage corner or clocks) for the speed change as shown in block 818. Additionally, the device controller may be configured to implement a device link speed change implementer 820. In an aspect, this device link speed change implementer 820 may process the speed change per the PCIe hardware programming guide as shown at 822, which may include performing link retraining and reconfiguring the PCIe interface circuits 216 and 260 for the new link speed. The link speed change implementer 820 may be implemented in software executed by the device controller 252, hardware associated with or coupled to the device controller 252, or some combination thereof.

When the link speed change process is completed, the device controller 252 may send a speed change completion message 824 to the host controller 212 to signal completion of the link speed change. In turn, the host controller 212 may signal the host client(s) 214 to call the host client deferred call back function for the bandwidth/speed change request 802 to signal that the change has been completed as shown at 826.

At 828, the host controller 212 updates the voltage levels (corners) of one or more of the voltages 242, 244, and 246 if needed based on the new link speed. For example, if the new link speed is lower (e.g., change from GEN3 speed to GEN2 or GEN1 speed), then the host controller 212 may reduce the voltage levels (corners) of one or more of the voltages 242, 244 and 246. In another example, if the new link speed is higher (e.g., change from GEN2 or GEN1 speed to GEN3 speed), then the host controller 212 may increase the voltage levels (corners) of one or more of the voltages 242, 244 and 246. If the voltage levels of the voltages 242, 244, and 246 for the new link speed are the same as for the previous link speed, then the host controller 212 may leave the voltage levels alone. The voltage scaling for the new link speed at 828 may be integrated with the link speed change process performed by the device link speed change implementer 820 (i.e., the voltage scaling may be part of the link speed change process).

At 830, the device controller 252 updates the voltage levels (corners) of one or more of the voltages 276, 278, and 280 if needed based on the new link speed. For example, if the new link speed is lower (e.g., change from GEN3 speed to GEN2 or GEN1 speed), then the device controller 252 may reduce the voltage levels (corners) of one or more of the voltages 276, 278 and 280. In another example, if the new link speed is higher (e.g., change from GEN2 or GEN1 speed to GEN3 speed), then the device controller 252 may increase the voltage levels (corners) of one or more of the voltages 276, 278 and 280. If the voltage levels of the voltages 276, 278, and 280 for the new link speed are the same as for the previous link speed, then the device controller 252 may leave the voltage levels alone.

The bandwidth solvers 704 or 804 may be implemented in any one of a number of ways to convert a bandwidth requirement from one of more clients (e.g., one or more host clients, one or more device clients, etc.) and convert the bandwidth requirement into one of the following link parameters: PCIe link speed only; PCIe link width only; and PCI link speed and link width. For the case of multiple clients, the bandwidth requirement may be the aggregate of the bandwidth requirements of the multiple clients. The bandwidth solvers 704 or 804 may also take into account additional parameters such as burst frequency. FIGS. 7 and 8 discussed above illustrate examples in which the bandwidth solver converts the bandwidth requirement for one of more clients into a link speed.

Figure 9:
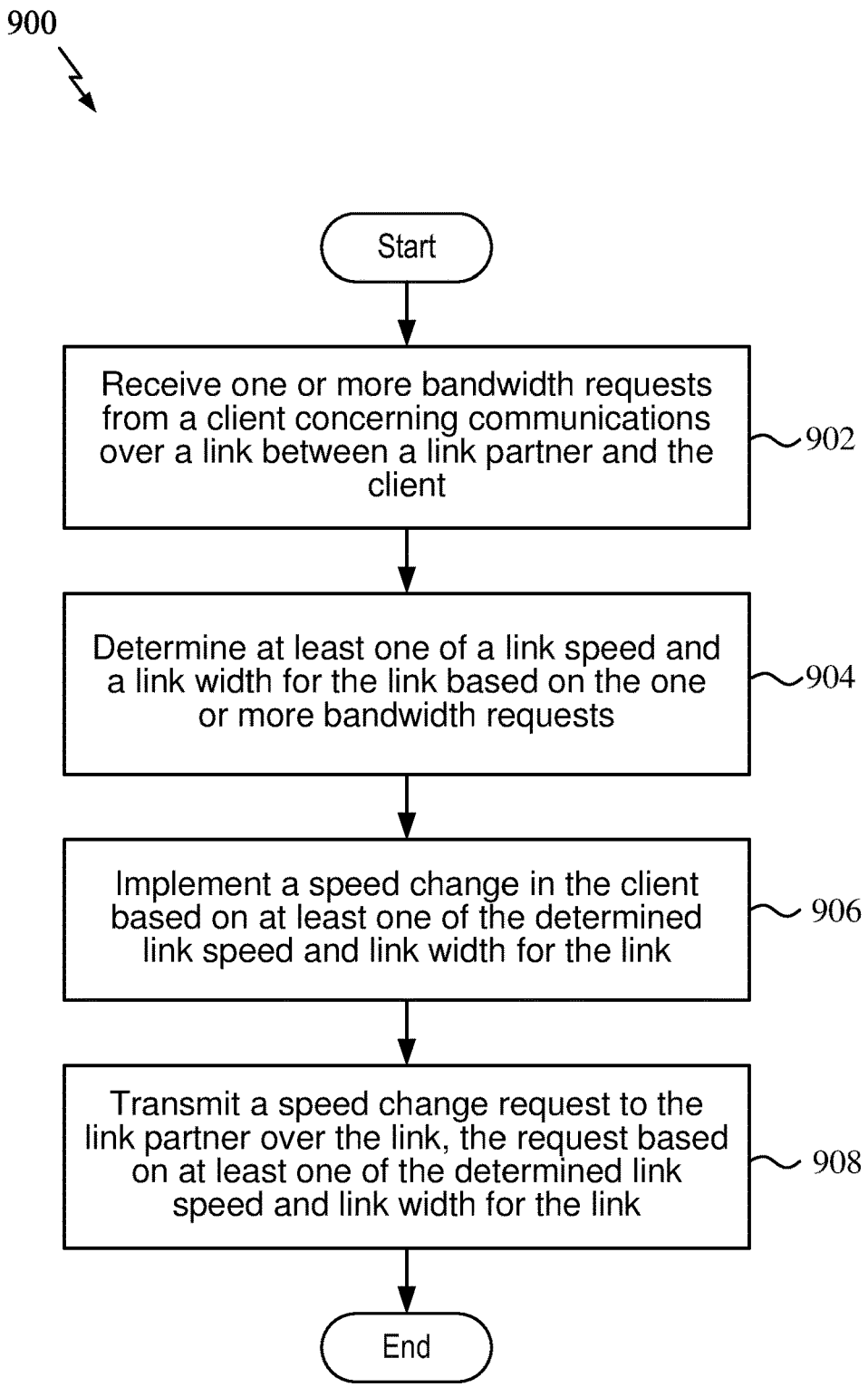
FIG. 9 illustrates a flow diagram of a further exemplary method for bandwidth based power management according to aspects of the present disclosure.

FIG. 9 illustrates a flow diagram of a method 900 for bandwidth based power management for a link, such as a PCIe link, according to aspects of the present disclosure. In certain aspects, method 900 effects scaling of one or more of the link speed (or bandwidth) and/or the link width, such as reducing the number of powered lanes (e.g., selective powering of drivers 320 or 345 on or off).

As may be seen in FIG. 9, method 900 includes receiving one or more bandwidth requests from a client (e.g., a "device client" 254 in the examples of FIGS. 4 and 7 or a "host client" 214 as in the examples of FIGS. 5 and 8) concerning communications over a link between a link partner (i.e., a link partner to a client such as device controller 252 in FIG. 4 or host controller 212 as shown in FIG. 5) and the client (e.g., 254 in FIG. 4 or 214 in FIG. 5) as shown in block 902. The processes of block 902 may be implemented by device controller 252 in one example, or by host controller 212 when executing the processes in FIG. 5. Additionally, the processes of block 902 may be implemented by software running in the device controller 252 or by hardware either within or coupled with device controller 252.

Method 900 further includes the processes of determining at least one of a link speed and a link width for the link based on the one or more bandwidth requests as shown in block 904. These determinations may be implemented by device controller 252 or software running therein, or alternatively in some hardware in communication with or part of the controller 252. In further aspects, the processes of block 904 may be implemented through the bandwidth solver 413 shown in FIG. 4. In yet further aspects, the processes of block 904 may be implemented by host controller 212 shown in FIG. 5 or software running thereon, or alternatively in some hardware in communication with or part of the controller 212. In further aspects, the processes of block 904 may be implemented through the bandwidth solver 513 shown in FIG. 5.

Moreover, method 900 includes implementing a speed change in the client (or host client in the example of FIG. 5) based on at least one of the determined link speed and link width for the link as shown in block 906. These processes may be implemented by device controller 252 (or host controller 212 in the example of FIG. 5) or software running therein, or alternatively by some dedicated hardware in communication with or part of the controller 252. In further aspects, the processes of block 904 may be implemented through the bandwidth solver 413 or 513 run in the controller 252 or 212 as shown in FIGS. 4 and 5. Additionally, the processes of block 906 may include the coordination of and/or communication with the host link speed change implementer 422 or 522.

Finally, method 900 includes transmitting a speed change request to the host (or over the link, the request based on at least one of the determined link speed and link width for the link as shown in block 908. This process may be implemented by the controllers 252 or 212, and by bandwidth solver 413 or 513 run in the controller 252 or 212 as shown in FIGS. 4 and 5 according to certain aspects. In some aspects, the transmittal in block 908 may be effectuated over the link 285 or by an interface such as interface 215 in the case of FIG. 5. Additionally, it is noted that various processes in any of blocks 902, 904, 906, and 908 may include the use of the PCIe interfaces 216 or 260 as shown in FIG. 2.

In still further aspects of method 900 it is noted that the client may include a peripheral component interconnect express (PCIe) endpoint device controller. Furthermore, the PCIe endpoint device controller may include a PCIe interface circuit configured to transmit the speed change request to the host via the link. In yet further aspects, the PCIe controller may implement the speed change in the client based on the at least one of the determined link speed and link width for the link.

As discussed before, the link in method 900 may be a peripheral component interconnect express (PCIe) link. It is noted, here, that while PCIe has been described herein, the method 900 is applicable to other links. Moreover the link speed comprises one of a plurality of different PCIe link speeds corresponding to different PCIe generations.

The link in method 900 may also include multiple lanes, and the link width corresponds to a number of the multiple lanes that are active, as was discussed earlier with respect to FIG. 3. Method 900 also includes determining the link speed for the link using a lookup table mapping each one of a plurality of bandwidths to a respective one of a plurality of link speeds. In yet further aspects, method 900 may include determining the link width using a lookup table mapping each one of a plurality of bandwidths to a respective one of a plurality of link widths. In other aspects, method 900 may utilize other algorithms based on the speed and the width of the transport to determine the optimal link parameters (e.g., the link speed).

In other aspects, method 900 includes determining the link speed for the link by determining power consumption for each one of a plurality of different link speeds satisfying the one or more bandwidth requests, and determining one of the plurality of different link speeds having the lowest power consumption. Additionally, method 900 may include determining the link width for the link by determining power consumption for each one of a plurality of different link widths satisfying the one or more bandwidth requests, and determining one of the plurality of different link widths having the lowest power consumption.

Moreover, method 900 may include supplying one of a plurality voltages or clocks to the interface circuit, and the controller being configured to set the one or more voltages or clocks to the interface circuit based on the link speed. In yet one more aspect, method 900 may include the link including a plurality of lanes each driven by a respective driver of a plurality of drivers and coupled to power switching circuitry configured to selectively power the plurality of drivers, and setting a number of the plurality of drivers to be selectively powered by the power switching circuitry to change the link width based on the determined link width for the link.

It is to be appreciated that the present disclosure is not limited to the exemplary terms used above to describe aspects of the present disclosure. For example, bandwidth may also be referred to as throughput, data rate or another term.

Although aspects of the present disclosure are discussed above using the example of the PCIe standard, it is to be appreciated that present disclosure is not limited to this example, and may be used with other standards.

The host client 214, the host controller 212, the device controller 252 and the device client 254 discussed above may each be implemented with a processor configured to perform the functions described herein by executing software including code for performing the functions. The software may be stored on a computer-readable storage medium, such as a RAM, a ROM, an EEPROM, an optical disk, and/or a magnetic disk.

Any reference to an element herein using a designation such as "first," "second," and so forth does not generally limit the quantity or order of those elements. Rather, these designations are used herein as a convenient way of distinguishing between two or more elements or instances of an element. Thus, a reference to first and second elements does not mean that only two elements can be employed, or that the first element must precede the second element.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect electrical or other communicative coupling between two structures. Also, the term "approximately" means within ten percent of the stated value.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A system comprising:
   a first chip that includes:
      a host device;
      a host controller;
      a first peripheral component interconnect express (PCIe) interface circuit; and
      a host system bus interface configured to couple the host device, the host controller and the first PCIe interface circuit;
   a second chip that includes:
      multiple clients;
      an endpoint device controller that is configured to control the multiple clients;
      a second PCIe interface circuit; and
      a client system bus interface configured to couple the multiple clients, the endpoint device controller and the second PCIe interface circuit; and
   a link that couples the first PCIe interface circuit with the second PCIe interface circuit,
   wherein the second PCIe interface circuit includes a serializer configured to serialize parallel transmit data received over the client system bus interface from the multiple clients, the parallel transmit data being generated for transmission over the link,
   and wherein the endpoint device controller is configured to:
      receive multiple bandwidth requests over the client system bus interface from the multiple clients;
      aggregate the multiple bandwidth requests into an aggregate bandwidth request;
      determine at least one of a link speed and a link width for the link based on the aggregate bandwidth request including determining when a change in the link speed or the link width is needed based on the aggregate bandwidth request; and
      send a speed change request to the host device via the second PCIe interface circuit, the link, and the first PCIe interface circuit after determining the at least one of the link speed and the link width.

2. The system of claim 1, wherein the endpoint device controller is a PCIe endpoint device controller.

3. The system of claim 2, wherein the host device comprises a PCIe host device.

4. The system of claim 1, wherein the endpoint device controller is configured to configure the second PCIe interface circuit to interface with the link at the at least one of the link speed and the link width.

5. The system of claim 1, wherein the link comprises a PCIe link.

6. The system of claim 5, wherein the link speed comprises one of a plurality of different PCIe link speeds corresponding to different PCIe generations.

7. The system of claim 5, wherein the link comprises multiple lanes, and the link width corresponds to a number of the multiple lanes that are active.

8. The system of claim 1, wherein the endpoint device controller is configured to determine the link speed for the link using a lookup table mapping each one of a plurality of bandwidths to a respective one of a plurality of link speeds.

9. The system of claim 1, wherein the endpoint device controller is configured to determine the link width for the link using a lookup table mapping each one of a plurality of bandwidths to a respective one of a plurality of link widths.

10. The system of claim 1, wherein the endpoint device controller is configured to determine the link speed for the link by:
   determining power consumption for each one of a plurality of different link speeds satisfying the aggregate bandwidth request; and
   determining one of the plurality of different link speeds having a lowest power consumption.

11. The system of claim 1, wherein the endpoint device controller is configured to determine the link width for the link by:
   determining power consumption for each one of a plurality of different link widths satisfying the aggregate bandwidth request; and
   determining one of the plurality of different link widths having a lowest power consumption.

12. The system of claim 1, further comprising:
   a power management integrated circuit (PMIC) configured to supply one or more voltages to the second PCIe interface circuit; and
   the endpoint device controller is configured to set the one or more voltages supplied by the PMIC to the second PCIe interface circuit based on the link speed.

13. The system of claim 1, wherein:
   the link comprises multiple lanes;
   the second PCIe interface circuit comprises a plurality of drivers, wherein each of the plurality of drivers is configured to drive a respective one of the lanes;
   the system includes a power switch circuit configured to selectively power the plurality of drivers; and
   the endpoint device controller is configured to set a number of the plurality of drivers that are powered by the power switch circuit based on the link width.

14. A method comprising:
   receiving in an endpoint device controller multiple bandwidth requests from multiple clients concerning transmission of data over a link between a host device and the multiple clients using one or more of a plurality of link speeds or widths, wherein the host device and a first PCIe interface circuit are included in a first chip, the host device being coupled to the link through the first PCIe interface circuit, and wherein the endpoint device controller and the multiple clients are included in a second chip, the endpoint device controller being coupled to the link through a second PCIe interface circuit;
   aggregating the multiple bandwidth requests into an aggregate bandwidth request;
   determining in the endpoint device controller at least one of a link speed and a link width for the link based on the aggregate bandwidth request including determining when a change in the link speed or the link width is needed based on the aggregate bandwidth request;
   implementing a speed change with the endpoint device controller based on at least one of the determined link speed and link width for the link when the change in the link speed or the link width is needed; and
   transmitting a speed change request to the host device over the link, the speed change request based on the at least one of the determined link speed and link width for the link, wherein the second chip comprises a client system bus interface configured to couple the multiple clients, the endpoint device controller and the second PCIe interface circuit, and
   wherein the second PCIe interface circuit is configured to serialize parallel transmit data received over the client system bus interface from the multiple clients for transmission over the link.

15. The method of claim 14, wherein the endpoint device controller comprises a PCIe endpoint device controller.

16. The method of claim 15, wherein the PCIe endpoint device controller is configured to transmit the speed change request to the host device through the second PCIe interface circuit and via the link.

17. The method of claim 15, wherein the PCIe endpoint device controller is configured to implement the speed change based on the at least one of the determined link speed and link width for the link.

18. The method of claim 14, wherein the link comprises a PCIe link.

19. The method of claim 18, wherein the link speed comprises one of a plurality of different PCIe link speeds corresponding to different PCIe generations.

20. The method of claim 14, wherein the link comprises multiple lanes, and the link width corresponds to a number of the multiple lanes that are active.

21. The method of claim 14, further comprising:
   determining the link speed for the link using a lookup table mapping each one of a plurality of bandwidths to a respective one of a plurality of link speeds.

22. The method of claim 14, further comprising:
   determining the link width for the link using a lookup table mapping each one of a plurality of bandwidths to a respective one of a plurality of link widths.

23. The method of claim 14, further comprising:
   determining the link speed for the link by:
      determining power consumption for each one of a plurality of different link speeds satisfying the aggregate bandwidth request; and
      determining one of the plurality of different link speeds having a lowest power consumption.

24. The method of claim 14, further comprising:
   determining the link width for the link by:
      determining power consumption for each one of a plurality of different link widths satisfying the aggregate bandwidth request; and
      determining one of the plurality of different link widths having a lowest power consumption.

25. The method of claim 14, further comprising:
   supplying one or more voltages or clocks to the second PCIe interface circuit; and
   setting the one or more voltages or clocks supplied to the second PCIe interface circuit based on the link speed.

26. The method of claim 14, further comprising:
   configuring a plurality of drivers to drive the link, the link including a plurality of lanes each driven by a respective driver of the plurality of drivers coupled to power switching circuitry configured to selectively power the plurality of drivers; and
   setting a number of the plurality of drivers to be selectively powered by the power switching circuitry based on the link width.

27. The system of claim 1, wherein the endpoint device controller is configured to vary a voltage domain of the second PCIe interface circuit dependent on the determined link speed or link width for the link based on the aggregate bandwidth request, and the speed change request sent to the host device is configured to enable the host device to vary a host device voltage domain that coordinates with the voltage domain of the second PCIe interface circuit.

28. The method of claim 14, further comprising:
varying a voltage domain of the endpoint device controller dependent on the determined link speed or link width for the link based on the aggregate bandwidth request;
wherein the speed change request sent to the host device is configured to enable the host device to vary a host device voltage domain that coordinates with the voltage domain of the endpoint device controller.

29. A system comprising:
a first chip that includes:
a first peripheral component interconnect express (PCIe) interface circuit;
multiple host clients;
a host device controller that is configured to control the multiple host clients; and
a host system bus interface configured to couple the multiple host clients, the host device controller and the first PCIe interface circuit;
a second chip that includes:
an endpoint device;
an endpoint device controller;
a second PCIe interface circuit; and
a client system bus interface configured to couple the endpoint device, the endpoint device controller and the second PCIe interface circuit; and
a link that couples the first PCIe interface circuit with the second PCIe interface circuit,
wherein the first PCIe interface circuit includes a serializer configured to serialize parallel transmit data received over the host system bus interface from the multiple host clients, the parallel transmit data being generated for transmission over the link,
and wherein the host device controller is configured to:
receive multiple bandwidth requests from the multiple host clients;
aggregate the multiple bandwidth requests into an aggregate bandwidth request;
determine at least one of a link speed and a link width for the link based on the aggregate bandwidth request including determining when a change in the link speed or the link width is needed based on the aggregate bandwidth request; and
send a speed change inform message to the endpoint device via the first PCIe interface circuit, the link and the second PCIe interface circuit after determining the at least one of the link speed and the link width.

30. The system of claim 29, wherein the endpoint device comprises a PCIe endpoint device, and the first PCIe interface circuit is configured to transmit the speed change inform message to the PCIe endpoint device via the link.

31. The system of claim 1, wherein the speed change request indicates the determined link speed.

32. The system of claim 1, wherein the second PCIe interface circuit is configured to transmit data from the multiple clients to the host device through the second PCIe interface circuit, over the link, and through the first PCIe interface circuit.

33. The system of claim 1, wherein the multiple bandwidth requests include at least one bandwidth request received before or after a transition of the link between idle and active states.

34. The system of claim 1, wherein the multiple bandwidth requests include a plurality of bandwidth requests from at least one of the multiple clients related to different requested bandwidths.

* * * * *